(12) United States Patent
Poirier et al.

(10) Patent No.: US 12,355,963 B2
(45) Date of Patent: Jul. 8, 2025

(54) TRIANGLE AND MULTI-HYPOTHESIS COMBINATION FOR VIDEO CODING AND DECODING

(71) Applicant: INTERDIGITAL MADISON PATENT HOLDINGS, SAS, Paris (FR)

(72) Inventors: Tangi Poirier, ThorignéFouillard (FR); Karam Naser, Mouazé (FR); Edouard Francois, Bourg des Comptes (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 18/123,560

(22) Filed: Mar. 20, 2023

(65) Prior Publication Data

US 2023/0291899 A1    Sep. 14, 2023

Related U.S. Application Data

(63) Continuation of application No. 17/292,294, filed as application No. PCT/US2019/062169 on Nov. 19, 2019, now Pat. No. 11,647,187.

(30) Foreign Application Priority Data

Nov. 30, 2018 (EP) .................................... 18306594
Dec. 20, 2018 (EP) .................................... 18306776

(51) Int. Cl.
*H04N 19/119* (2014.01)
*H04N 19/132* (2014.01)
(Continued)

(52) U.S. Cl.
CPC ......... *H04N 19/119* (2014.11); *H04N 19/132* (2014.11); *H04N 19/159* (2014.11); *H04N 19/176* (2014.11)

(58) Field of Classification Search
CPC .. H04N 19/119; H04N 19/132; H04N 19/159; H04N 19/176
See application file for complete search history.

(56) References Cited

U.S. PATENT DOCUMENTS

2011/0200097 A1    8/2011  Chen et al.
2015/0131724 A1    5/2015  Lin et al.
(Continued)

FOREIGN PATENT DOCUMENTS

CN    105493505 A    4/2016
CN    106416245 A    2/2017
(Continued)

OTHER PUBLICATIONS

Blaser et al., "CE10: Results on Geometric Block Partitioning (Test 3.3)", JVET-K0146, RWTH Aachen University, Jul. 10-18, 2018, pp. 1-6.

(Continued)

*Primary Examiner* — Hesham K Abouzahra
(74) *Attorney, Agent, or Firm* — Condo Roccia Koptiw LLP

(57) ABSTRACT

At least a method and an apparatus are provided for efficiently encoding or decoding video. For example, a plurality of different motion prediction modes for a current block are obtained. The current block is encoded or decoded based on a combination of the plurality of different motion prediction modes with corresponding weights for a plurality of sub-blocks of the current block, wherein the combination with the corresponding weights comprising an inter prediction mode and an intra prediction mode.

20 Claims, 22 Drawing Sheets

(51) Int. Cl.
*H04N 19/159* (2014.01)
*H04N 19/176* (2014.01)

(56) References Cited

U.S. PATENT DOCUMENTS

| | | | |
|---|---|---|---|
| 2015/0373357 A1 | 12/2015 | Pang et al. | |
| 2017/0142418 A1 | 5/2017 | Li et al. | |
| 2018/0124398 A1 | 5/2018 | Park et al. | |
| 2018/0262773 A1 | 9/2018 | Chuang et al. | |
| 2019/0379901 A1 | 12/2019 | Chiang et al. | |
| 2020/0007882 A1 | 1/2020 | Abe et al. | |
| 2020/0029073 A1* | 1/2020 | Chiang | H04N 19/159 |
| 2020/0045306 A1* | 2/2020 | Lee | H04N 19/51 |
| 2021/0058637 A1 | 2/2021 | Zhang et al. | |
| 2021/0120242 A1* | 4/2021 | Nam | H04N 19/122 |

FOREIGN PATENT DOCUMENTS

| | | |
|---|---|---|
| WO | 2016/175550 A1 | 11/2016 |
| WO | 2018/127188 A1 | 7/2018 |

OTHER PUBLICATIONS

Chen, Jianle et al., "Algorithm Description for Versatile Video Coding and Test Model 2 (VTM 2)", Joint Video Experts Team (JVET) of ITU-T SG 16 WP 3 and ISO/IEC JTC 1/SC 29/WG11; Editors; 11th Meeting: Ljubljana, SI; JVET-K1002-V2, Jul. 10-18, 2018, 21 pages.
Chiang, et al., "CE10.1: Combined and Multi-Hypothesis Prediction", JVET-K0257-V1, MediaTek Inc., Joint Video Expelis Team (JVET) of ITU-T SG16 WP3 and ISO/IEC JTC 1/SC 29/WG 11, 11th Meeting Ljubljana, Slovenia, Jul. 10-18, 2018, 6 pages.
Chiang, et al., "CE10.1: Combined and Multi-Hypothesis Prediction for Improving AMVP Mode, Skip or Merge Mode, and Intra Mode", JVET-L0100-V3, MediaTek Inc., Joint Video Experts Team (JVET) of itu-t sg 16 WP 3 and ISO/IED JTC 1/SC 29/WG 11, 12th Meeting, Macao, China, Oct. 3, 2018, 14 pages.
Hsu, et al., "Description of Core Experiment 10: Combined and Multi- Hypothesis Prediction", JVET-K1030-V3, Joint Video Experts Team (JVET) of ITU-T SG 16 WP3 and ISO/IEC JTC 1/SC 29/WG 11, 11th Meeting: Ljubljana, Slovenia, Jul. 10, 2018, 11 pages.
Hsu, et al., "Description of Core Experiment 10: Combined and Multi- Hypothesis Prediction", JVET-L1030-V2, Ce Coordinators, Joint Video Experts Team (JVET) of ITU-T SG 16 WP3 and ISO/IEC JTC 1/SC 29/WG 11, 12th Meeting: Macao, CN, Oct. 3-12, 2018, 12 pages.
ISO/IEC, "Information Technology—Generic Coding of Moving Pictures and Associated Audio Information: Video", ISO 13818-2: 1995 (E), Recommendation ITU-T H.262, International Organization for Standardization (ISO) and the International Electrotechnical Commission (IEC), International Standard 13818-2, Jul. 1995, 211 pages.
ISO/IEC, "Information Technology—Generic Coding of Moving Pictures and Associated Audio Information: Video", ISO 13818-2: 1995 (E), Recommendation ITU-T H.262, International Organization for Standardization (ISO) and the International Electrotechnical Commission (IEC), International Standard 13818-2, Jul. 1995, 255 pages.
ITU-T, "Information Technology—Generic Coding of Moving Pictures and Associated Audio Information: Systems", H.222.0, Series H: Audiovisual and Multimedia Systems, Infrastructure of Audiovisual Services- Transmission Multiplexing and Synchronization, Jun. 2012, 228 pages.
ITU-T, "Reference Software for ITU-T H.265 High Efficiency Video Coding", Recommendation ITU-T H.265.2, Series H: Audiovisual and Multimedia Systems, Infrastructure of Audiovisual Services—Coding of Moving Video, Oct. 2014, 12 pages.
Liao, et al., "CE10 Related: Combining Multi-Hypothesis Prediction with Triangular Prediction Unit Mode", JVET-K0148-V2, Panasonic, Joint Video Exploration Team (JVET) of ITU-T SG 16 WP 3 and ISO/IEC JTC 1/SC 29/WG 11, 11th Meeting: Ljubljana, SI, Jul. 10-18, 2018, 4 pages.
Liao, et al., "CE10: Triangular Prediction Unit Mode (CE10.3.1 and CE10.3.2)", JVET-K0144-V2, Joint Video Exploration Team (JVET) of ITU-T SG16 WP3 and ISO/IEC JTC 1/SC 29/WG 11, 11th Meeting Ljubljana, Slovenia, Jul. 10, 2018, 6 pages.
Poirier, et al., "CE10-Related: Multiple Prediction Unit Shapes", JVET-L0208-V1, Joint Video Experts Team (JVET) of ITU-T SG16 WP3 and ISO/IEC JTC 1/SC 29/WG 11, 12th Meeting: Macao, China, Oct. 3, 2018, 6 pages.
Winken et al., "CE10: Multi-Hypothesis Inter Prediction (Tests 1.2.a-1.2.c)", JVET-L0148-v3, Fraunhofer HHI, Joint Video Experts Team (JVET) of ITU-T SG 16 WP 3 and ISO/IEC JTC 1/SC 29/WG 11, 12th Meeting: Macao, CN, Oct. 3- 12, 2018, pp. 1-12.

* cited by examiner

TRIANGLE AND MULTI-HYPOTHESIS COMBINATION FOR VIDEO CODING AND DECODING

This application is a continuation of U.S. patent application Ser. No. 17/292,294 (now U.S. Pat. No. 11,647,187), which is the National Stage Entry under 35 U.S.C. § 371 of Patent Cooperation Treaty Application No. PCT/US2019/062169 filed Nov. 19, 2019, which claims the benefit of European Patent Application No. 18306594.5, filed Nov. 30, 2018 and European Patent Application No. 18306776.8, filed Dec. 20, 2018, the disclosures of each of which are incorporated by reference herein in their entireties.

TECHNICAL FIELD

At least one of the present embodiments generally relates to a method or an apparatus for video encoding or decoding, and more particularly, to a method or an apparatus for efficiently providing video compression and/or decompression with a combination of multi-shape and multi-hypothesis predictions, among others.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transformation, and prediction.

Recent additions to video compression technology include various industry standards, versions of the reference software and/or documentations such as Joint Exploration Model (JEM) and later VTM (Versatile Video Coding (VVC) Test Model) being developed by the JVET (Joint Video Exploration Team) group. The aim is to make further improvements to the existing HEVC (High Efficiency Video Coding) standard.

SUMMARY

The drawbacks and disadvantages of the prior art are solved and addressed by one or more aspects described in this application.

According to an embodiment, a method for video encoding is provided, comprising: obtaining a plurality of different motion prediction modes for a current block; and encoding the current block based on a combination of the plurality of different motion prediction modes with corresponding weights for a plurality of sub-blocks of the current block, wherein the combination with the corresponding weights comprising an inter prediction mode and an intra prediction mode.

According to another embodiment, a method for video decoding is provided, comprising: obtaining a plurality of different motion prediction modes for a current block; and decoding the current block based on a combination of the plurality of different motion prediction modes with corresponding weights for a plurality of sub-blocks of the current block, wherein the combination with the corresponding weights comprising an inter prediction mode and an intra prediction mode.

According to another embodiment, an apparatus for video encoding is provided, comprising: means for obtaining a plurality of different motion prediction modes for a current block; and means for encoding the current block based on a combination of the plurality of different motion prediction modes with corresponding weights for a plurality of sub-blocks of the current block, wherein the combination with the corresponding weights comprising an inter prediction mode and an intra prediction mode.

According to another embodiment, an apparatus for video decoding is provided, comprising: means for obtaining a plurality of different motion prediction modes for a current block; and means for decoding the current block based on a combination of the plurality of different motion prediction modes with corresponding weights for a plurality of sub-blocks of the current block, wherein the combination with the corresponding weights comprising an inter prediction mode and an intra prediction mode.

According to another embodiment, an apparatus for video encoding is presented, comprising one or more processors, wherein said one or more processors are configured to: obtain a plurality of different motion prediction modes for a current block; and encode the current block based on a combination of the plurality of different motion prediction modes with corresponding weights for a plurality of sub-blocks of the current block, wherein the combination with the corresponding weights comprising an inter prediction mode and an intra prediction mode.

According to another embodiment, an apparatus for video decoding is presented, comprising one or more processors, wherein said one or more processors are configured to: obtain a plurality of different motion prediction modes for a current block; and decode the current block based on a combination of the plurality of different motion prediction modes with corresponding weights for a plurality of sub-blocks of the current block, wherein the combination with the corresponding weights comprising an inter prediction mode and an intra prediction mode.

According to another embodiment, a signal comprising encoded video is formed by: obtaining a plurality of different motion prediction modes for a current block; encoding the current block based on a combination of the plurality of different motion prediction modes with corresponding weights for a plurality of sub-blocks of the current block, wherein the combination with the corresponding weights comprising an inter prediction mode and an intra prediction mode; and forming the bitstream comprising the encoded current block.

According to another embodiment, each of the corresponding weights is applied to all samples inside a corresponding sub-block.

According to another embodiment, the current block is partitioned into one or more prediction regions, each with a given shape.

According to another embodiment, the one or more prediction regions comprising one or more triangular regions.

According to another embodiment, the plurality of different motion prediction modes comprise a multi-shape prediction and a multi-hypothesis prediction.

According to another embodiment, the plurality of different motion prediction modes comprising the multi-shape prediction and the multi-hypothesis prediction are indicated in one or more lists of possible motion vector candidates.

According to another embodiment, the corresponding weights are power of 2.

According to another embodiment, the corresponding weights depend on an intra direction of the intra prediction mode.

According to another embodiment, number of the one or more prediction regions in multi-shape prediction depend on a size of the current block.

Additionally, an embodiment provides a computer program product comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

BRIEF DESCRIPTION OF THE DRAWINGS

FIG. 16 illustrates triangle prediction with one weight per sub-block.

FIG. 17 illustrates storage of weights used by sub-blocks.

Figure 30:
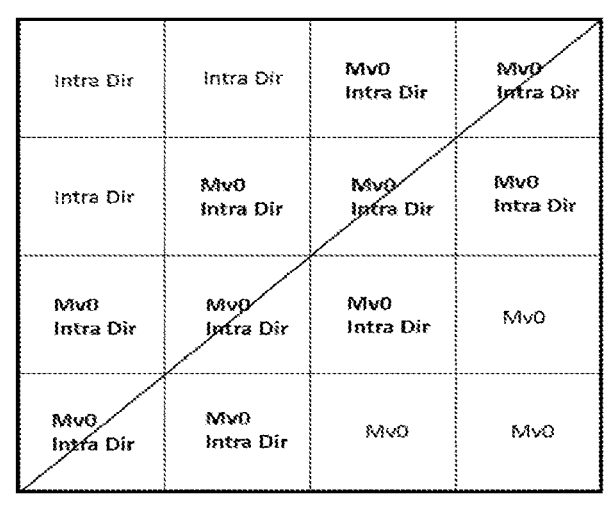

FIG. 30 illustrates prediction information storage for multiple shapes and multi-hypothesis combination.

DETAILED DESCRIPTION

The disclosure is in the field of video compression and decompression, and at least one embodiment relates more specifically prediction of a block performed either using two different inter predictions or a combination of an inter prediction and an intra prediction.

For clarity of description, the following description will describe aspects with reference to embodiments involving video compression technology such as, for example, HEVC, JEM and/or H.266. However, the described aspects are applicable to other video processing technologies and standards.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
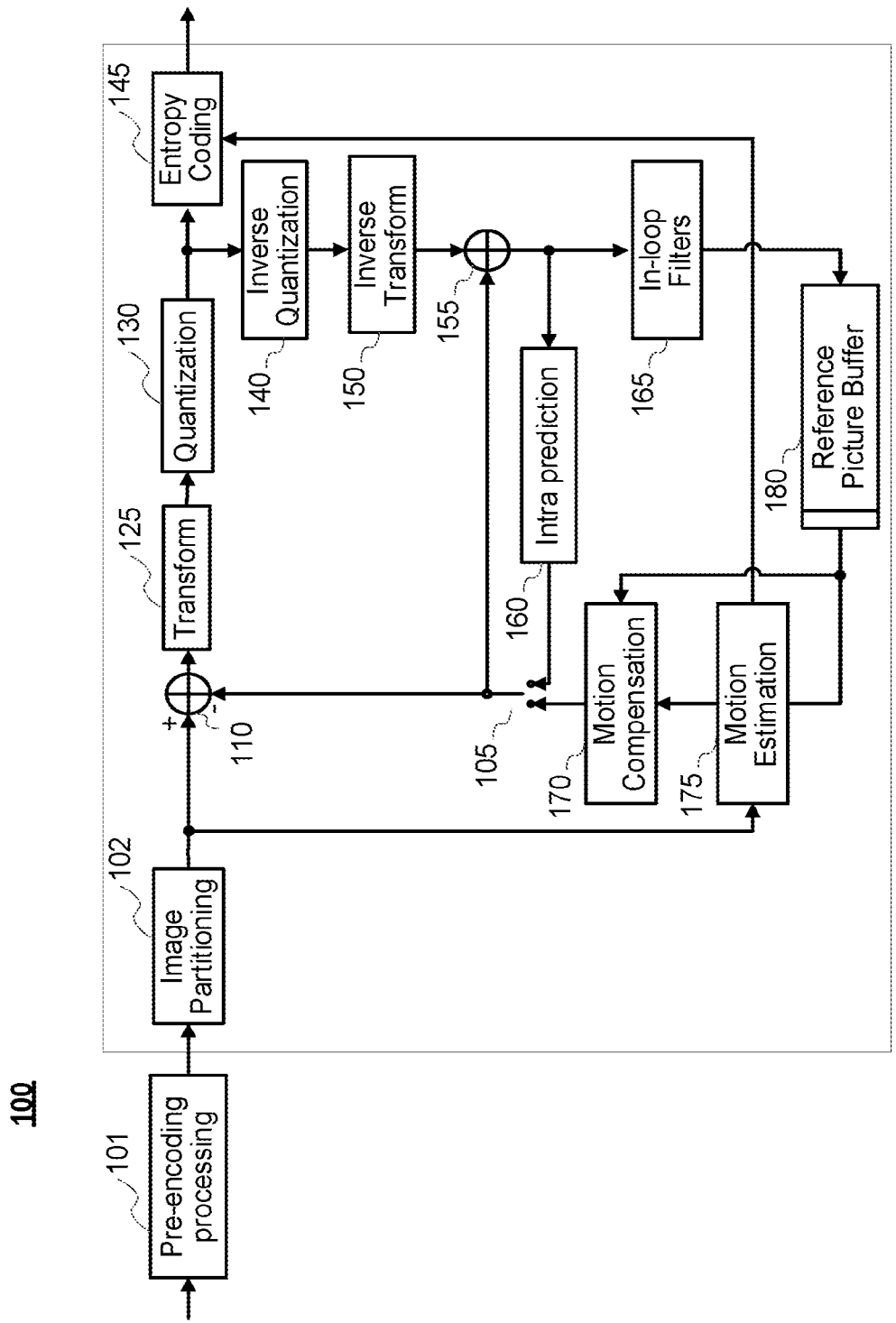
FIG. 1 illustrates a block diagram of an embodiment of a video encoder.
Figure 2:
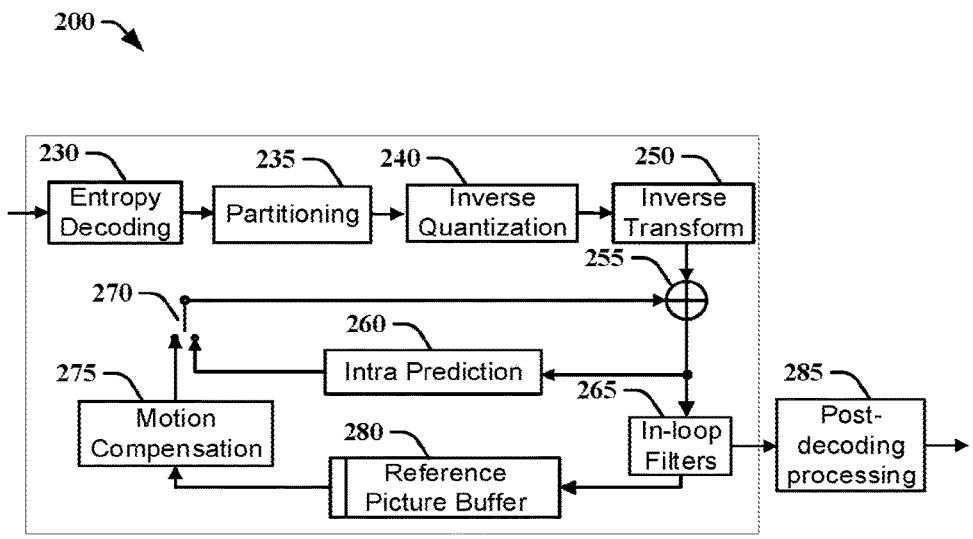
FIG. 2 illustrates a block diagram of an embodiment of a video decoder.
Figure 3:
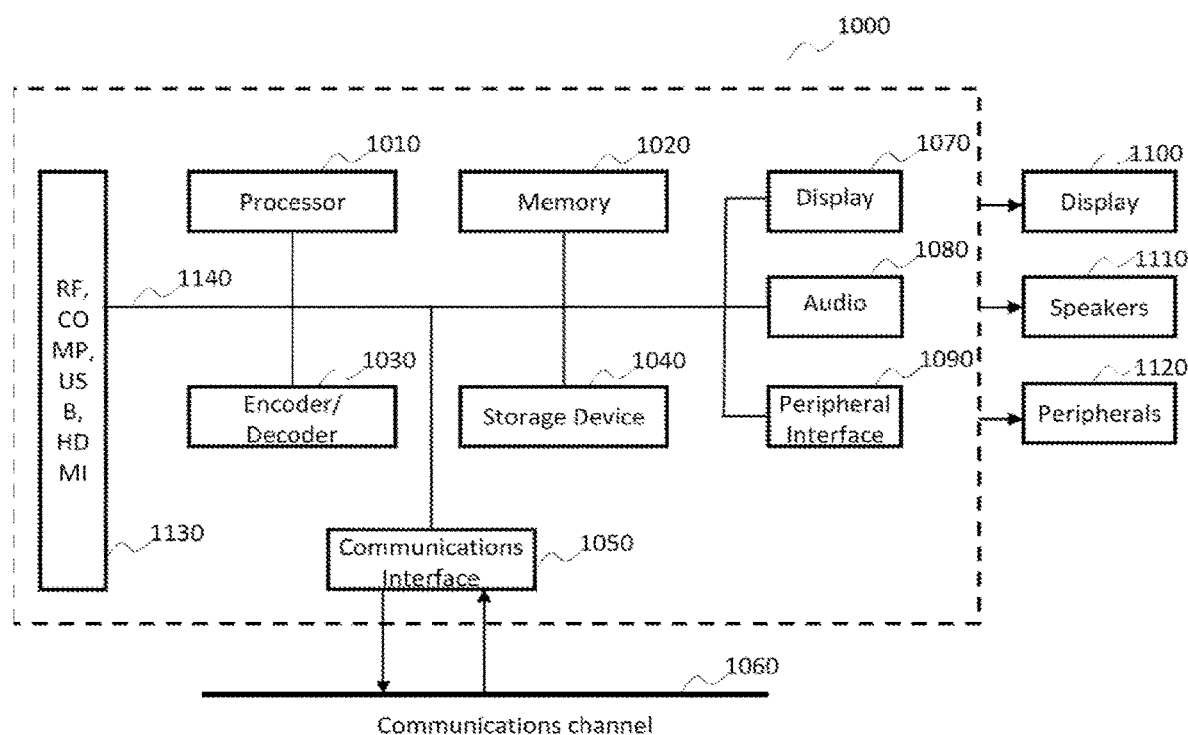
FIG. 3 illustrates a block diagram of a system within which aspects of the present embodiments may be implemented.

The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIGS. 1 and 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example regarding block sizes. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations. Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data. In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

Figure 10:
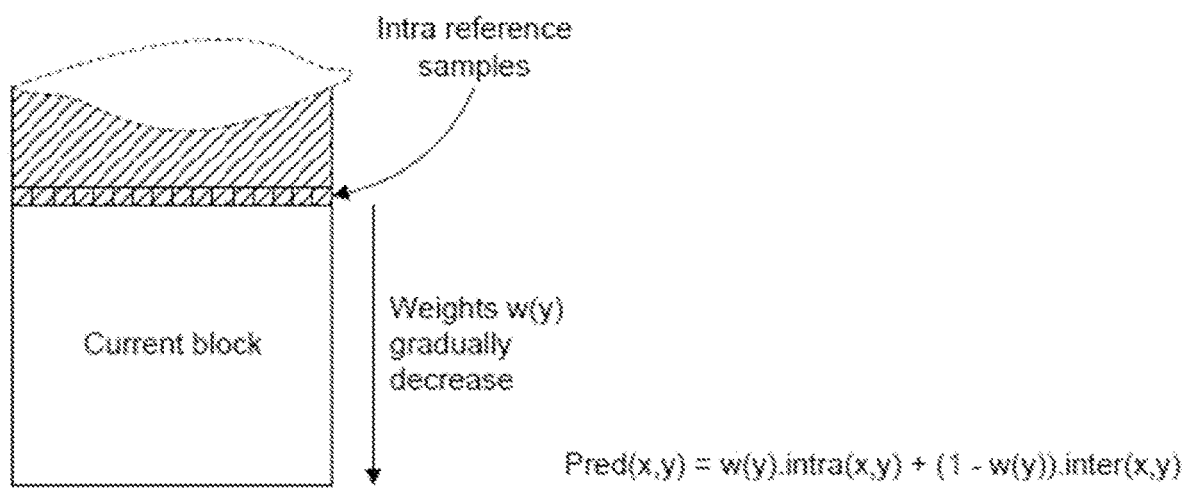
FIG. 10 illustrates multi-hypothesis prediction in case of inter and intra modes combination.

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COIMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna. Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

The encoder 100 of FIG. 1, decoder 200 of FIG. 2 and system 1000 of FIG. 3 are adapted to implement at least one of the embodiments described below.

Figure 4:
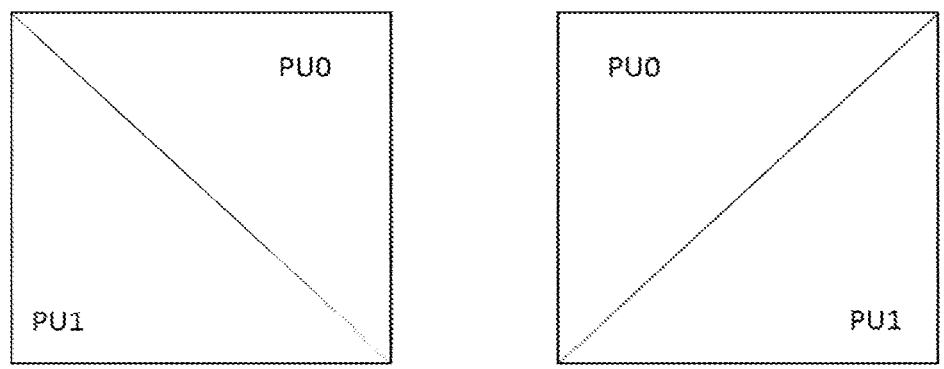
FIG. 4 illustrates splitting of a CU into two triangular prediction units.

When using triangular prediction in merge mode, a Coding Unit (CU) is split into two triangular Prediction Units (PUs), either in diagonal or inverse diagonal direction, as shown in FIG. 4. Each triangular Prediction Unit in the CU is inter-predicted using its own motion vector and reference frame index which are derived from a merge candidate list.

Figure 5:
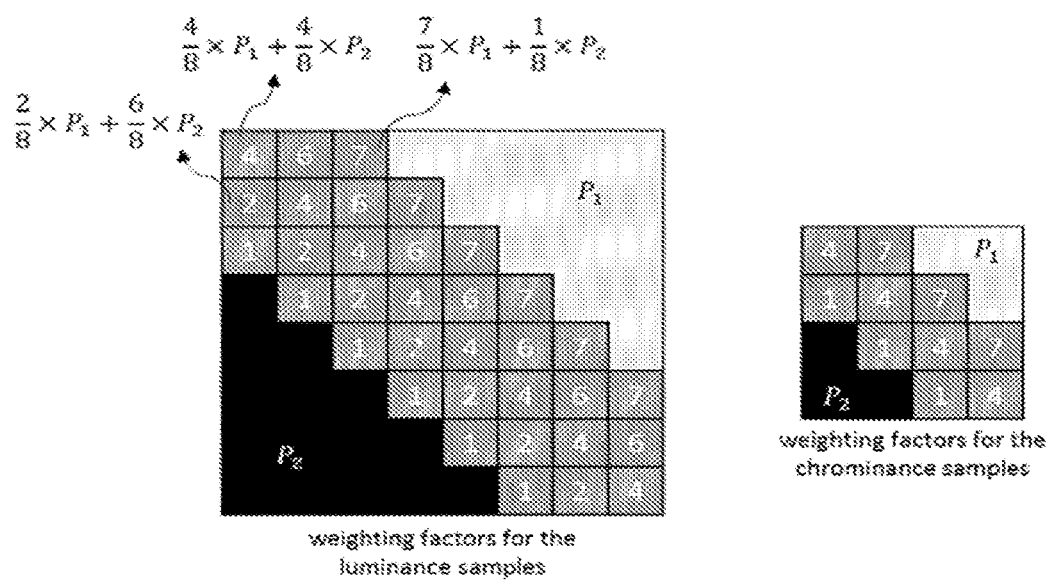
FIG. 5 illustrates a weighting process on a diagonal edge between two triangular prediction units.

An adaptive weighting process is applied to the prediction samples of diagonal or inverse diagonal edge between the two triangular Prediction Units to derive the final prediction samples values for the whole CU as shown in FIG. 5.

The triangular Prediction Unit mode is only applied to CUs in skip or merge mode. When the triangular Prediction Unit mode is applied to the CU, an index (merge_idx) indicating the direction of splitting the CU into two triangular Prediction Units, plus the motion vectors of the two triangular Prediction Units, are signaled.

Figure 6:
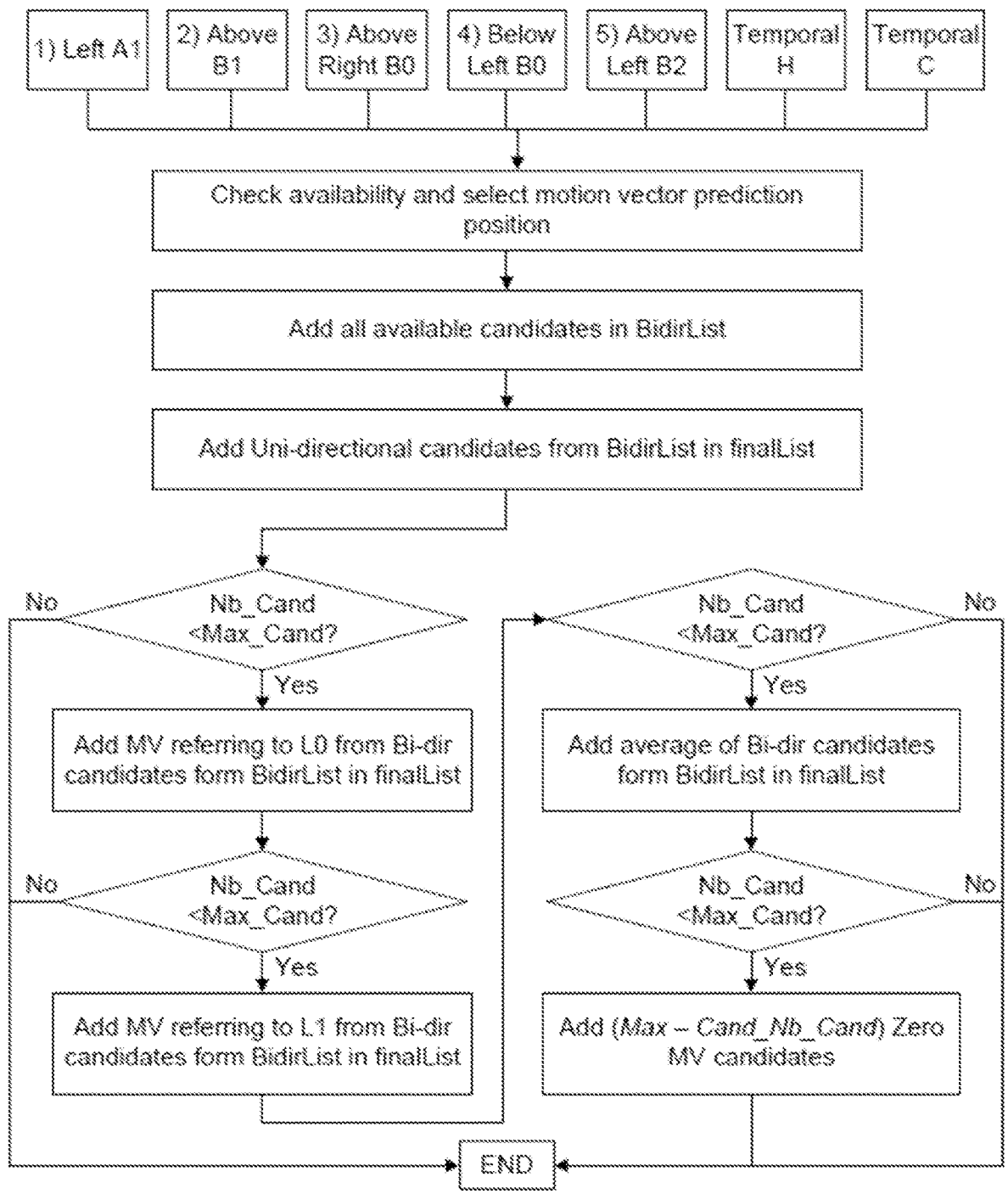
FIG. 6 illustrates a derivation process for uni-directional predictors for triangle partitions.

A common list of 5 uni-directional predictors is derived for both Prediction Units. The same spatial and temporal positions are checked than in conventional merge process, but only uni-directional vectors are used. Redundant motion vectors are not added to the list and zero motion vectors are added at the end of the list if there are not enough candidates. The uni-directional predictors derivation process is depicted in FIG. 6.

The number of motion vector predictors is 5 for a given Prediction Unit. 20 combinations are tested for each diagonal (5*4=20, the same motion vector predictor cannot be used for both PUs). The index ranges from 0 to 39 and a look-up table, made of a list of triplets, is used for deriving splitting direction and motion vectors for each PU from the index. The first element of a given triplet gives the diagonal direction, the second and third elements give respectively the predictor index for PU0 and PU1 respectively. The index syntax is shown in Table 1.

TABLE 1

Triangle partitions (PUs) and corresponding merge index syntax

| prediction_unit( x0, y0, nPbW, nPbH ) { | Descriptor |
|---|---|
| if( cu_skip_flag[ x0 ][ y0 ]) { | |
|    triangle_flag[ x0 ][ y0] | |
|    if( MaxNumMergeCand > 1 ) { | |
|      if( triangle_flag[ x0 ][ y0] ) { | |
|        triangle_merge_data( x0, y0, nPbW, nPbH) | ae(v) |
|      } else { | |

TABLE 1-continued

Triangle partitions (PUs) and corresponding merge index syntax

| prediction_unit( x0, y0, nPbW, nPbH ) { | Descriptor |
|---|---|
|         merge_idx[ x0 ][ y0 ] | |
|     } | |
|   } | |
| } else { /* MODE INTER */ | |
|   merge_flag[ x0 ][ y0] | ae(v) |
|   if( merge_flag[ x0 ][ y0 ] ) { | |
|     if( MaxNumMergeCand > 1 ) { | |
|       if( triangle_flag[ x0 ][ y0]) { | |
|         triangle_merge_data( x0, y0, nPbW, nPbH) | |
|       } else { | |
|         merge_idx[ x0 ][ y0 ] | ae(v) |
|       } | |
|     } | |
|   } | |
| } | |
| triangle_merge_data( x0, y0, nPbW, nPbH) { | |
|   most_probable_idx[ x0 ][ y0 ] | u(1) |
|   if( most_probable_idx[ x0 ][ y0] ) { | |
|     zero_or_one_idx[ x0 ][ y0 ] | u(1) |
|   } else { | |
|     remaining_idx[ x0 ][ y0 ] | se(v) |
|   } | |
| } | |

Figure 7:
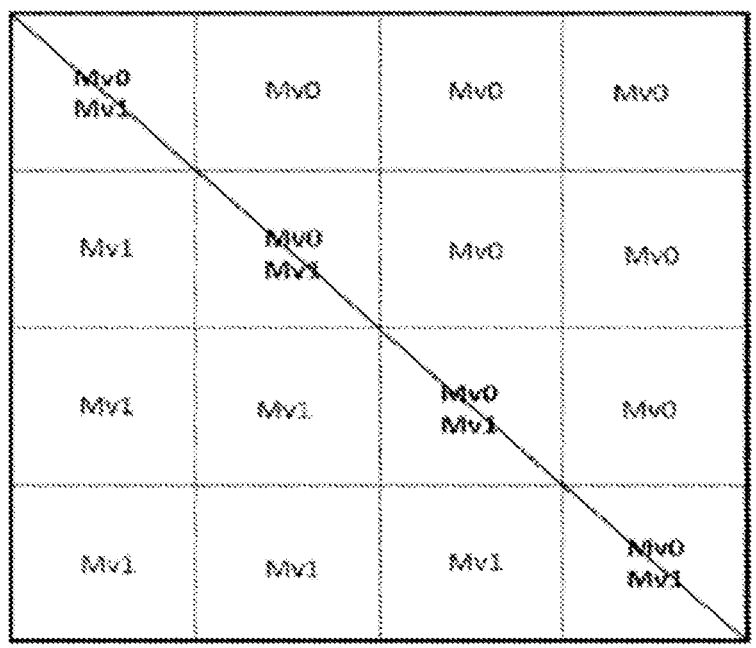
FIG. 7 illustrates sub-block motion vector storage for triangle partitions (PUs).

Motion vectors can be stored for each 4×4 sub-block. When triangle PUs are used for a CU, the motion vector used for a given partition (PU) is stored for each one of the sub-blocks that are not located on the diagonal or inverse diagonal edge. For sub-blocks located on the diagonal or inverse diagonal edge, the two motion vectors from the two partitions (PUs) are stored if they refer to different lists (LIST_0 for Mv0 and LIST_1 for Mv1, or inversely LIST_0 for Mv1 and LIST_1 for Mv0), if the two motion vectors refer to the same list, only one vector is stored, as shown in FIG. 7.

Figure 8:
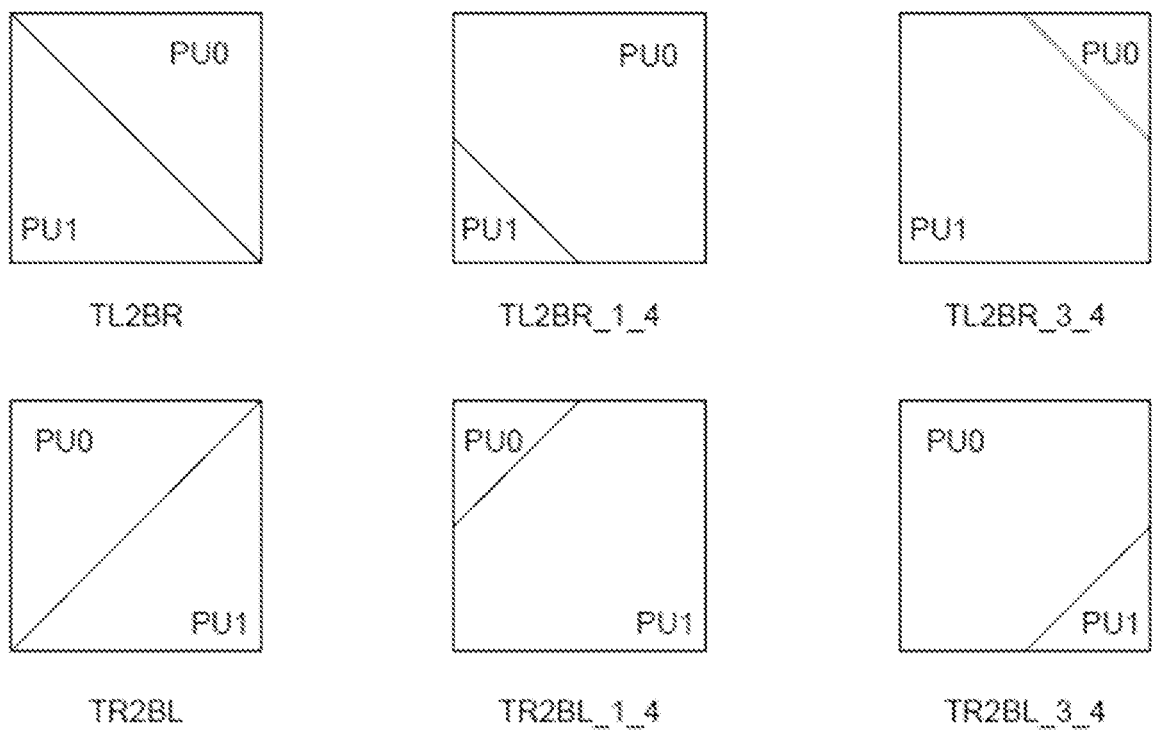
FIG. 8 illustrates additional partitions (PUs).
Figure 9:
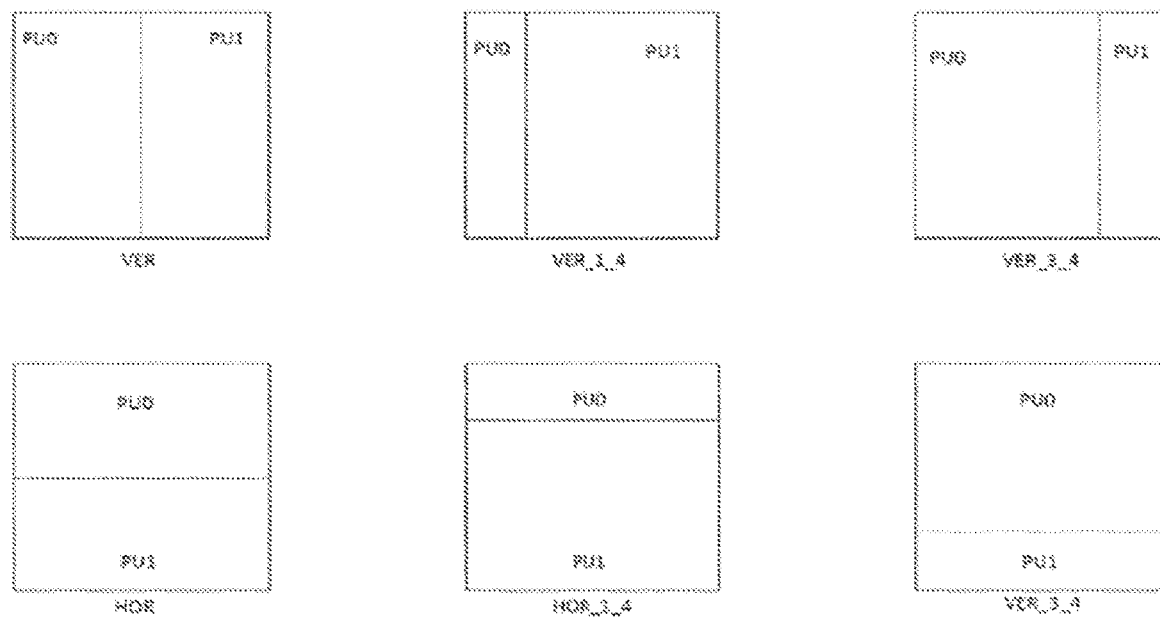
FIG. 9 illustrates additional non-triangle partitions (PUs).

Additional shapes such as non-triangle shapes may also be introduced for weighting two uni-predictions, as depicted in FIGS. 8 and 9.

In a new mode called intra-inter multi hypothesis (MH) mode, an inter prediction performed in merge mode (merge index is signaled to derive the motion information used for the motion compensated prediction) is combined with an intra prediction mode or with another inter mode (e.g. uni-prediction AMVP, skip or merge). The final prediction is the weighted average of the merge indexed prediction and the prediction generated by the intra prediction mode, where different weights are applied depending on the intra direction and the distance between the current sample and intra reference sample. The intra prediction mode is signaled (it can be a subset (e.g., 4) of the complete set of prediction modes).

Figure 11:
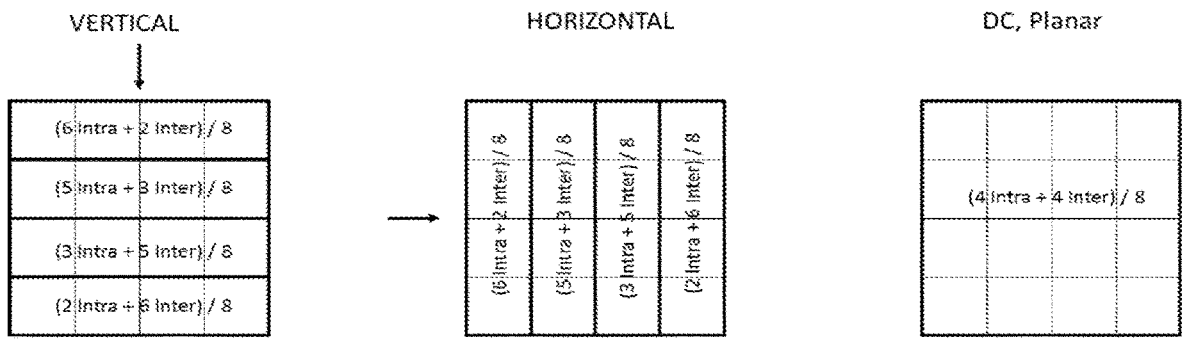
FIG. 11 illustrates intra prediction regions and their corresponding weights in multi-hypothesis mode.

As illustrated in FIG. 11, a current block is split into 4 equal-area regions. The weights gradually decrease as the region is far from the intra reference samples, thus gradually decreasing the impact of the intra image with regards to the predicted inter. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)=(2, 6), is applied to a corresponding region, as depicted in example of FIG. 10 for intra vertical direction prediction. When DC or planar mode is selected, or the CU width or height is smaller than 4, equal weights are applied for all samples. In intra prediction in multi hypothesis CUs, chroma components use Direct mode (same intra direction as luma).

FIG. 11 shows the shapes used for the 4 intra prediction used in multi-hypothesis.

In the following, the terms triangular partitions and multiple shapes partitions are used but may be interchangeable depending on the context and application.

However, for triangular merge the weighting process of the two prediction is pixel-wise, and pixel-wise operations implementations are more difficult to optimize than block or sub-blocks operations.

Figure 12:
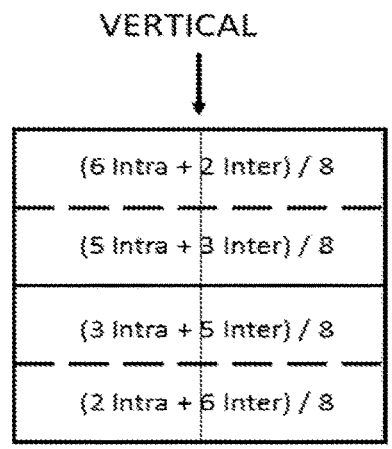
FIG. 12 illustrates 2×8 sub regions for an 8×8 CU with vertical prediction for multi-hypothesis mode.

Multi-hypothesis (MH), if horizontal or vertical prediction is selected, uses 4 sub-regions corresponding to 4 different weights for the weighting process. MH mode may be available for a block with an area greater than or equal to 64 samples, which means that 4×16 and 16×4 blocks are allowed. In this case for horizontal or vertical prediction, MH may use 16×1 and 1×16 regions. For 8×8 blocks, 2×8 sub-regions may be used, as shown in FIG. 12. However, the area used for the predictions were 4×4. In other words, there can be an inconsistency between the areas for which the prediction information is stored and the area that were actually used to perform these predictions, according to the respective sizes of these areas.

Moreover, for triangle PUs, except for sub-blocks covering the diagonal or inverse diagonal edge, only one motion vector is stored even if this sub-block is close to the edge, inducing a loss of information.

For multi-hypothesis, motion vector and intra direction are stored but only inter information is used as predictor for inter neighboring blocks and intra information for intra neighboring blocks.

These two aspects make the design of both tools (triangular partitioning and multi-hypothesis prediction modes) inconsistent.

Figure 13:
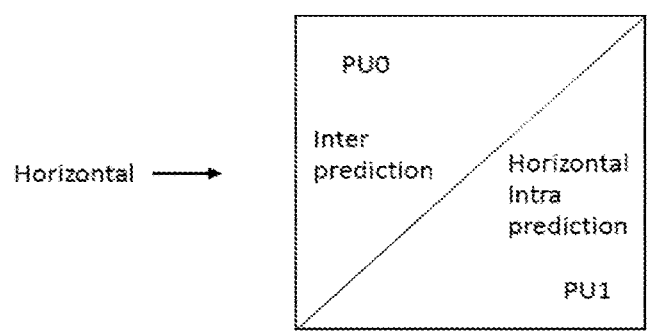
FIG. 13 illustrates how horizontal prediction is used for a second partition of a top-right to bottom-left triangle partition.

In addition, in a combination of triangle partitions (PUs) and multi-hypothesis prediction, direction of the triangles may be incompatible with intra prediction and the way the weighting process is done. For example, in FIG. 13, the Top-Right to Bottom-Left (TR2BL) triangle partitioning is selected. The horizontal intra prediction for the second PU (PU1) is less efficient because left side of PU 1 is far from the reconstructed samples used for the intra prediction at the left line external to the current CU.

Figure 14:
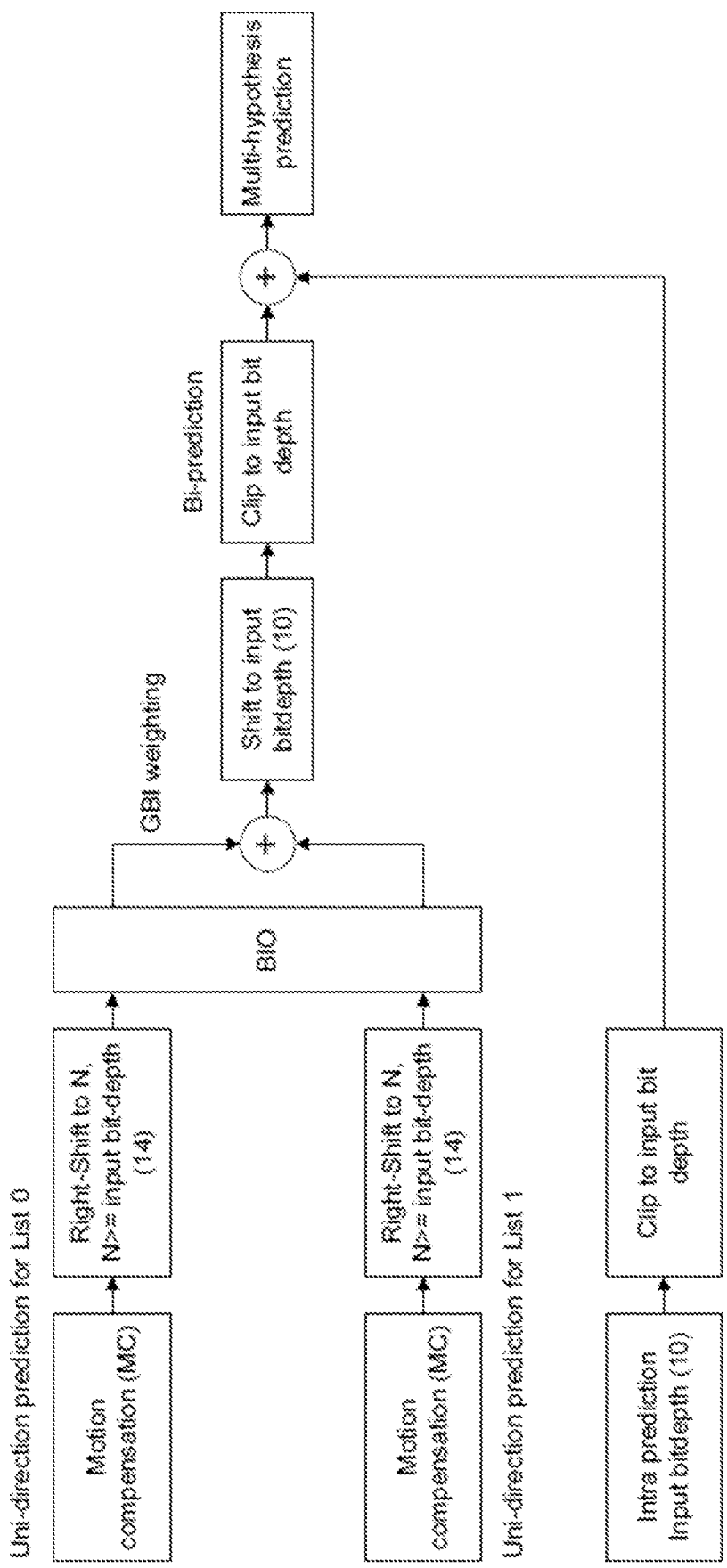
FIG. 14 illustrates a process or an apparatus for multi-hypothesis prediction.

Multi-hypothesis is a combination of intra and inter predictions. The inter part may use bi-prediction. The multi-hypothesis pipeline is composed of many steps: two motion compensations, Bi-directional Optical flow (BIO), Generalized Bi-prediction (GBi) weighting, clipping of inter and intra prediction, weighting of inter and intra prediction, as illustrated in FIG. 14.

Figure 15:
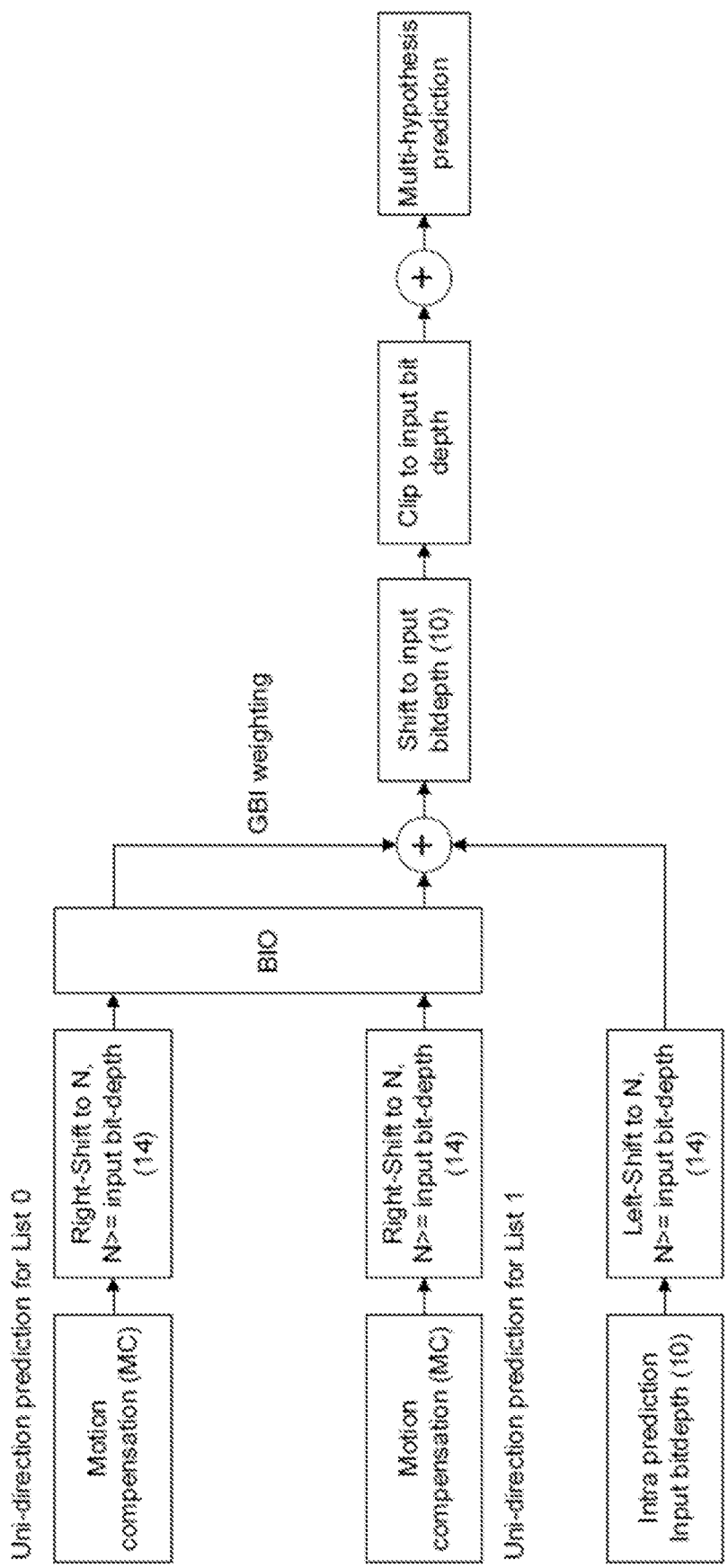
FIG. 15 illustrates a process or an apparatus for multi-hypothesis prediction with only one weighting step.

In one embodiment, only one weighting step is done to add the two uni-directional inter prediction and the intra prediction, as shown in FIG. 15. For inter predictions, motion compensation steps are done with a higher precision (typically 14 bits), intra prediction could also be done with higher precision, so the weightings of all predictions could be with higher precision. In VTM-3.0, for a Planar or DC intra prediction, the weights used for combining all the multi-hypothesis predictions are ¼ for uni-directional inter prediction and ½ for intra prediction. In this embodiment, as all the predictions are added during the same weighting steps, weights may be changed to be close to ⅓ (because of integer operations, it is preferred to use division by shifting, therefore dividing by, e.g., power of 2 to the number of the bit precision), for example, ⅜ for the 2 inter uni-predictions and ⅖ for intra prediction (⅜+⅜+⅖=1). Or ¹¹⁄₃₂ for inter uni-predictions and ¹⁰⁄₃₂ for intra prediction if we use 5 bits precision instead of 3 bits.

At least one embodiment relates to handling the prediction of a block while encoding or decoding video, wherein the prediction is performed either using two different inter predictions or a combination of an inter and an intra prediction, in the context where these predictions could potentially be completely unrelated. Thus, it is proposed to unify the designs of multi-shape PUs partitioning mode (and more specifically triangular partitioning mode) and of multi-hypothesis mode and proposes different exemplary aspects as follows:

- To apply the weighting in triangular partitioning (and more generally multi-shape PUs partitioning) per sub-block;
- To perform the storage of the weights per sub-block;
- To use weights that are power of 2;
- To adapt the number of regions in multi-hypothesis depending on the CU size;
- To force CUs combining multi-hypothesis prediction and multi-shape PUs partitioning to use uni-prediction only, therefore disabling BIO and GBi when multi-hypothesis prediction and multi-shape PUs partitioning are enabled for the CU;
- To add intra prediction modes as additional candidates in the candidate list of the multi-shape PUs partitioning mode;
- To disable some intra prediction modes for specific PUs of the multi-shape PUs partitioning, when the reference samples for the intra prediction are far from the samples of the PU to be predicted;
- To perform the storage of the motion vector, or of the intra mode, per sub-block, when multi-hypothesis prediction and multi-shape PUs partitioning are combined.

One or more aspects of the present embodiments such as, e.g., bi-prediction of inter coded blocks may be implemented, e.g., in the system 1000 of FIG. 3 and in elements 145, 170, 175 of an encoder 100 according to FIG. 1 and in elements 230 and 275 of a video decoder 200 according to FIG. 2.

Weighting Process by Sub-Block

Figures 16, 17:
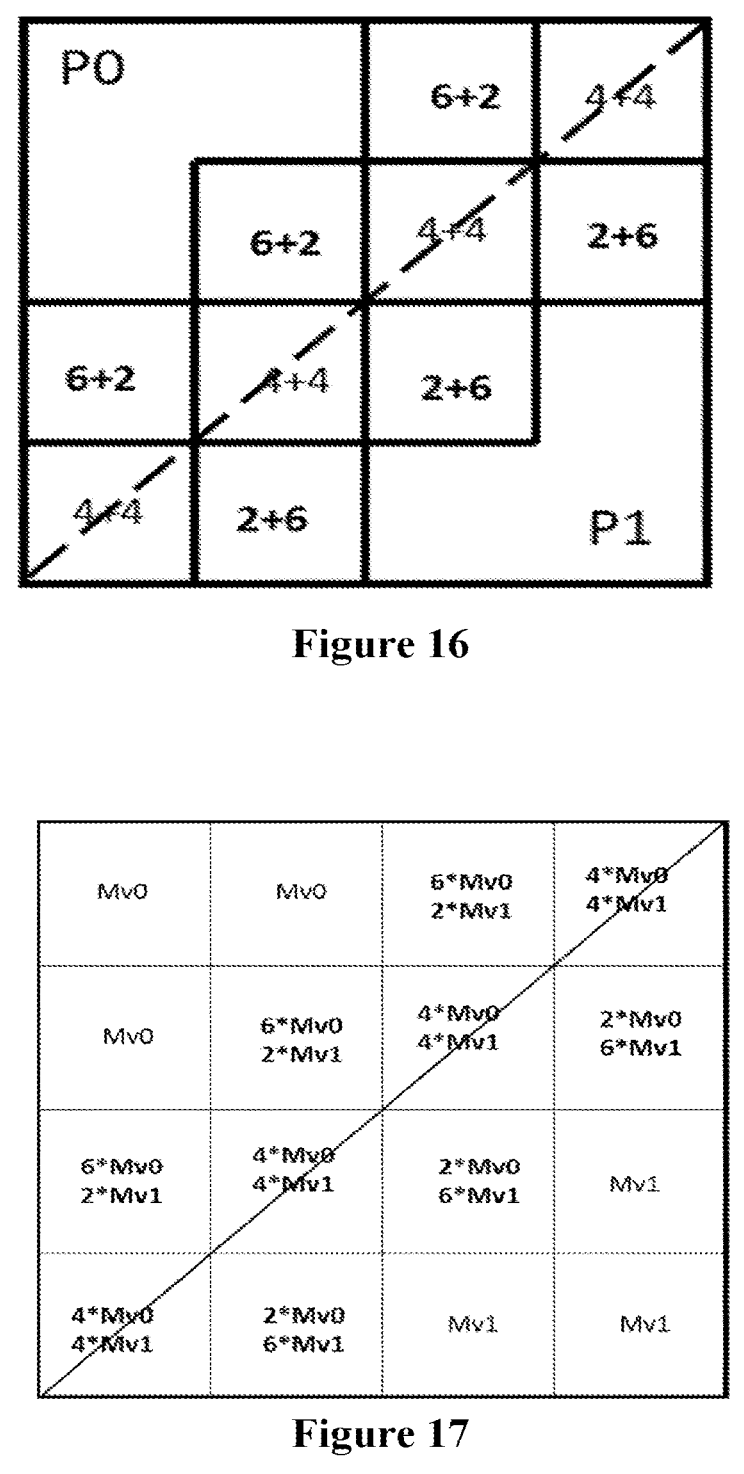

In an embodiment, the same weight is applied to all samples inside a given sub-block. For example, for triangle partitions, sub-blocks covering the edge may use the same weights for the 2 predictions P0 and P1. For a sub-block close to the edge but not covering the edge, the weight is bigger for the prediction corresponding to the triangle (or prediction unit) which the sub-block belongs to, as illustrated in FIG. 16. For example, the sub-blocks over the diagonal labelled 6+2 represent a weighting of ⅚ of P0 and ⅔ of P1. The diagonal has an equal weighting of both predictions. This principle applies similarly to rectangular partitions.

In an embodiment, the weights are specified as power of 2, which results in simplifying the computations by replacing multiplications by shifting operations. In a conventional example using 2 multiplications per sample and one division by 8, using weights equal to power of 2 would result in 2 shifts and one division (applied by a shift operation) and thus would be much more efficient.

Weight Storage by Sub-Block

In at least one embodiment, weighting by sub-block allows consistency between the weighting process and the storage of information. As generalized bi-prediction mode (GBi) uses weights that are already stored for each CU, the storage of weights used by weighting process for triangle or multi-hypothesis is free of cost. An example of storage of motion vector and associated weights per sub-blocks is shown in FIG. 17. As in the case of GBi, the weights can be used for predicting or inferring weights of next CUs processed later in the decoding process.

Adapting the Number of Sub-Regions for CUs Coded in Multi-Hypothesis Mode

Figure 18:
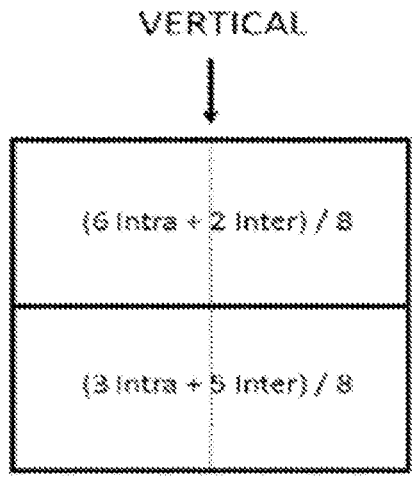
FIG. 18 illustrates an 8×8 CU predicted with multi-hypothesis and vertical intra prediction.

In at least one embodiment the number of sub-regions for CUs coded in multi-hypothesis mode are adapted. If the size of the block in the direction of the prediction is smaller than a given size S (for example S=16), less sub-regions are used in order to have a minimum of number samples $S_{min}$ (for example $S_{min}$=4) in one given sub-region. In an embodiment, the number of sub-regions is set to one sub-region for 4×N CUs, and to two sub-regions for 8×N CUs). In an embodiment, an 8×8 CU coded with multi-hypothesis and using vertical intra prediction is used. The weighting process for the weighting of intra and inter prediction use 2 sub-regions of size 4×8, as shown in FIG. 18.

Combination of Multi-Hypothesis and Multiple Shapes Prediction Units

Uni-Directional Inter Prediction Restriction for Multi-Hypothesis

In the following embodiments, multi-hypothesis mode is replaced by a multiple-shape prediction mode where one of the predictors is an intra mode.

Figure 19:
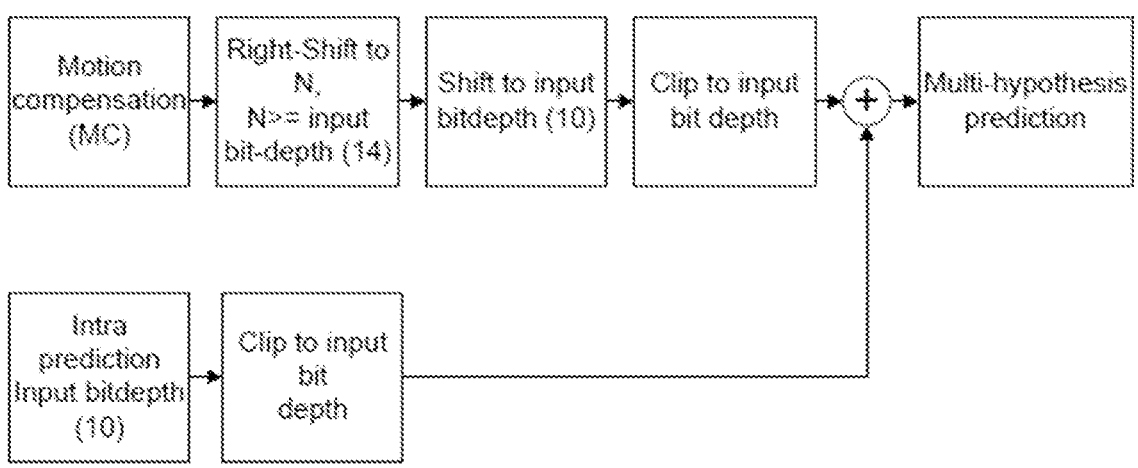
FIG. 19 illustrates a process or an apparatus for multi-hypothesis prediction with uni-directional inter prediction restriction.

In an embodiment, the following restriction is specified for combining the multi-hypothesis prediction mode and the multiple shapes prediction mode. When multi-hypothesis prediction mode and multiple shapes prediction mode are both enabled for a current CU, inter prediction is restricted to uni-directional. This restriction disables by design BIO and GBi weighting as these two processes are used only for bi-prediction. The syntax elements associated with these two modes are therefore not decoded. The multi-hypothesis pipeline with this uni-directional restriction is depicted in FIG. 19, to be compared with FIG. 14 or 15. It allows the process to be more efficient by simplifying the pipeline.

Figure 20:
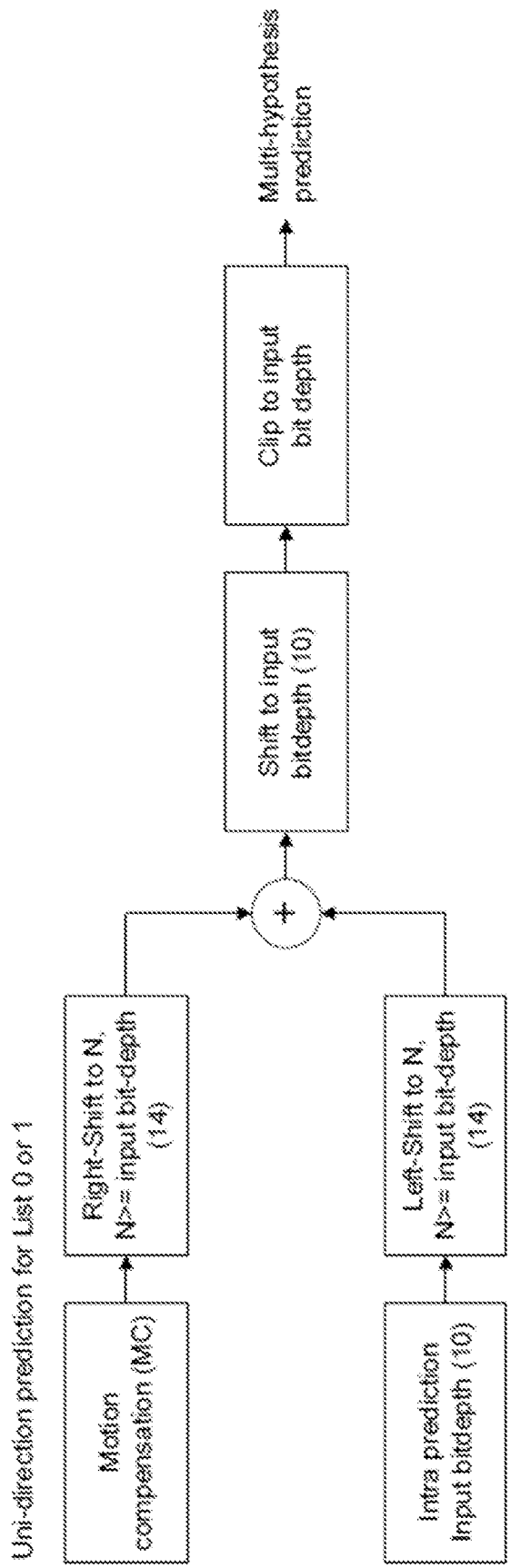
FIG. 20 illustrates a process or an apparatus for multi-hypothesis prediction with uni-directional inter prediction restriction and clipping after intra-inter combination.

To reduce further the multi-hypothesis pipeline, clipping of the prediction may be done only once after the combination of intra and inter prediction, as depicted in FIG. 20. This allows a weighting process between inter and intra prediction with a higher precision (typically 14 bits instead of 10 bits).

An example of syntax and semantics applying this restriction is shown in the table below. The flags merge_triangle_flag and mh_merge_flag are first signaled in the bitstream. When both flags are equal to 1, bi-prediction cannot be applied. The syntax element gbi_idx signaling the weighting index is therefore not signaled, and the parameter activating BIO (bioEnableFlag) is forced to 0. If at least one of the flags is equal to 0, and that bi-prediction mode is activated, gbi_idx is signaled, and bioEnableFlag is possibly set to 1.

| coding_unit( x0, y0, cbWidth, cbHeight, treeType ) { | Descriptor |
|---|---|
| ... | |
|   merge_triangle_flag[ x0 ][ y0 ] | ae(v) |
|   mh_merge_flag[ x0 ][ y0 ] | ae(v) |
|   if( mh_merge_flag[ x0 ][ y0 ] == 0) | ae(v) |
|     mh_intra_flag[ x0 ][ y0 ] | ae(v) |
|   if( merge_triangle_flag [ x0 ][ y0 ] == 1 && mh_merge_flag[ x0 ][ y0 ] == 1) | |
|     bioEnableFlag = 0 | |
|   else | |
|     gbi_idx[ x0 ][ y0 ] | ae(v) |
| ... | |
| } | |

Intra Prediction as an Additional Candidate for Multiple Shapes

In an embodiment, to harmonize multiple shapes prediction and multi-hypothesis prediction, intra modes are added in the predictor list of multiple shapes prediction. For triangle partition mode, a list of 5 uni-directional motion vectors can be derived, 2 motion vectors among the 5 predictors are then selected, one for each partition (PU), to predict the current CU.

Derive Intra Mode from Neighboring Blocks

Figure 21:
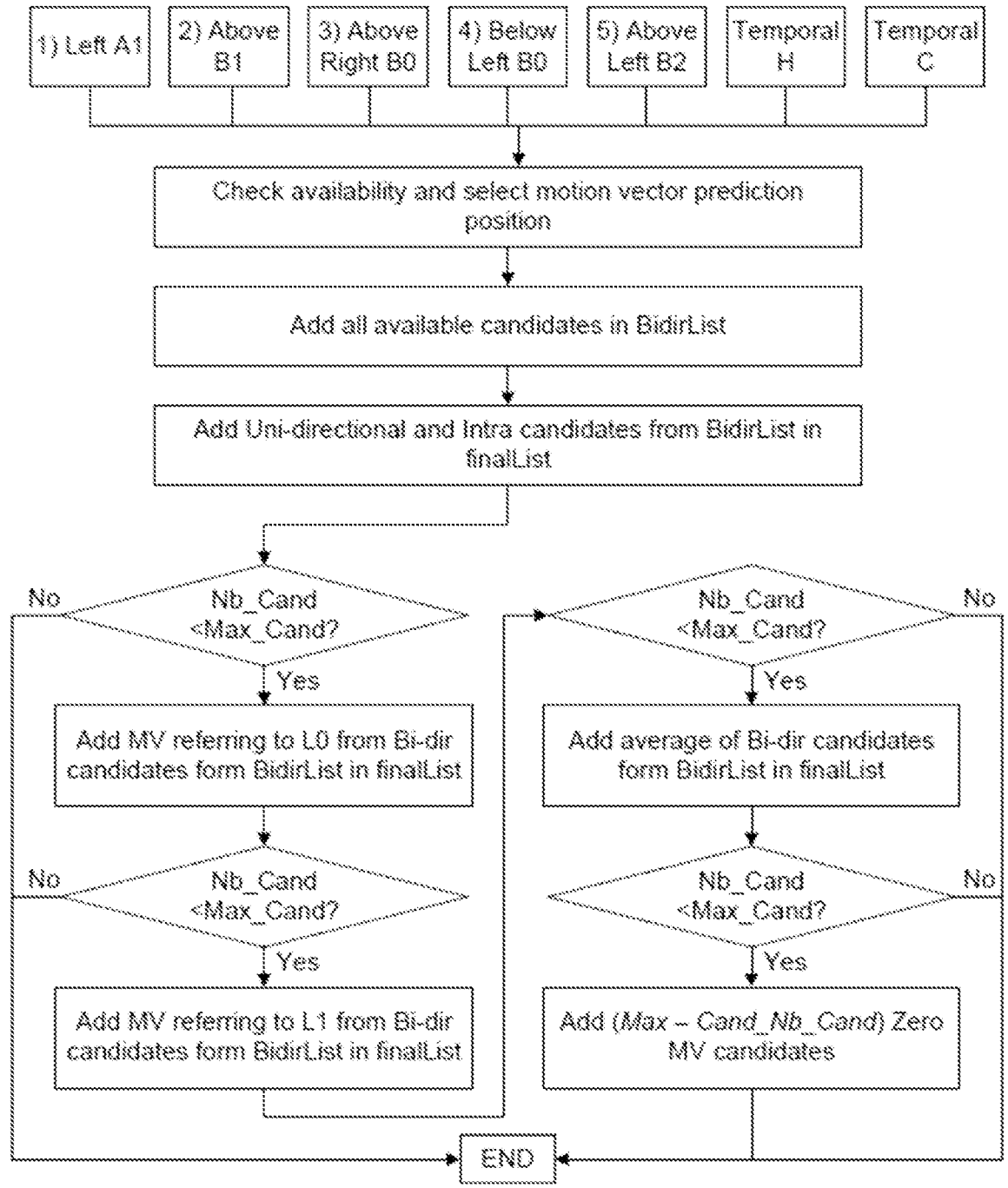
FIG. 21 illustrates a derivation process for uni-directional or intra predictors for multiple shapes partitions.

A first way to add intra direction in the list of predictors is to propagate the intra direction from the neighboring blocks. Instead of discarding a neighboring intra coded blocks, intra direction from a neighboring block is added into the candidate list derivation for multiple shapes prediction mode. Compare to the derivation process of predictors for triangle/multiple shapes partitions, intra modes from neighboring blocks are added to the final predictor list, as shown in FIG. 21.

Implicit Intra Prediction Direction from Partition Shape

Figure 22:
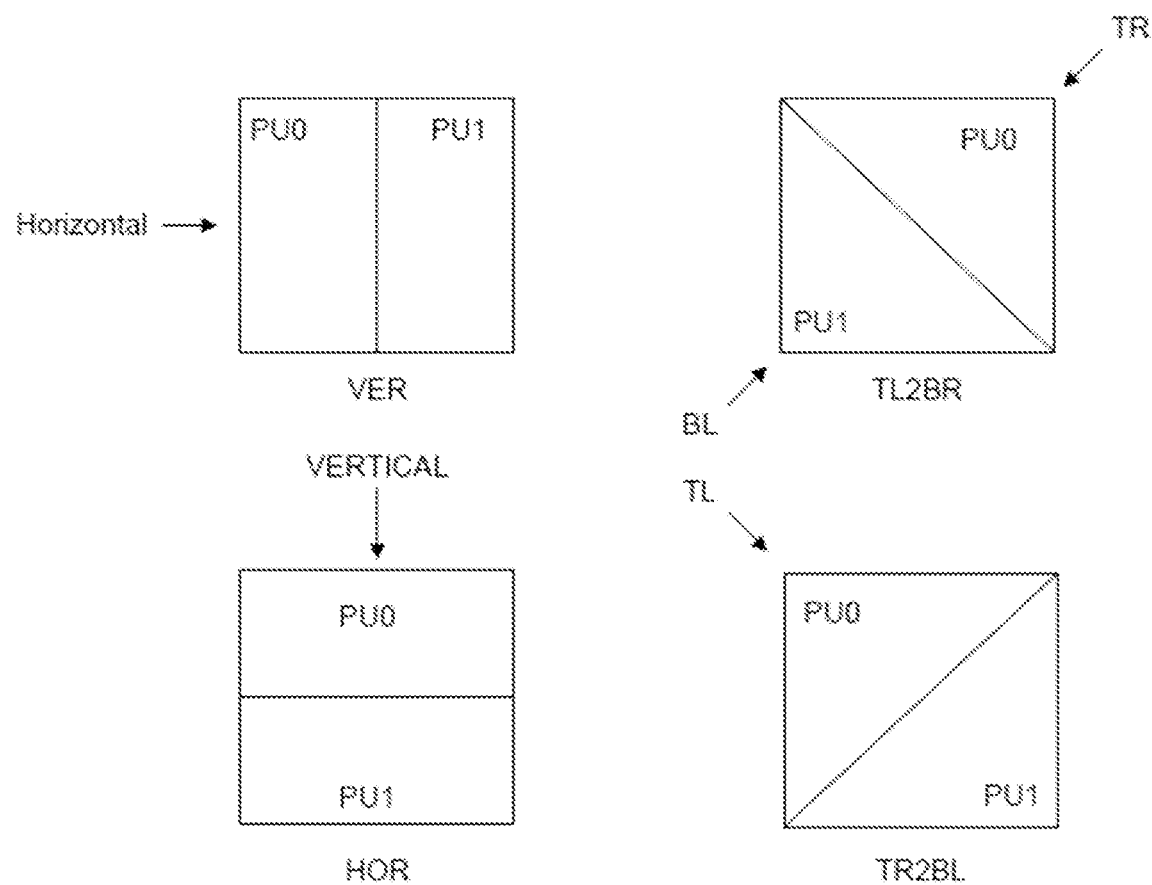
FIG. 22 illustrates inferred intra directional prediction depending on a prediction shape.

A second way to add intra direction in the list of predictors is to implicitly add one or more intra direction to the list of predictors depending on the PU shape. For instance, in an embodiment, the following is used (as depicted in FIG. 22).

horizontal prediction is added for vertical PU shape,
vertical prediction for horizontal PU shape,
top-left directional prediction for TR2BL (Top Right to Bottom Left) PU shape,
bottom-left and top-right directional predictions for PU TL2BR (Top Left to Bottom Right) shape,
DC, Planar may be added for all partitions.

Figure 23:
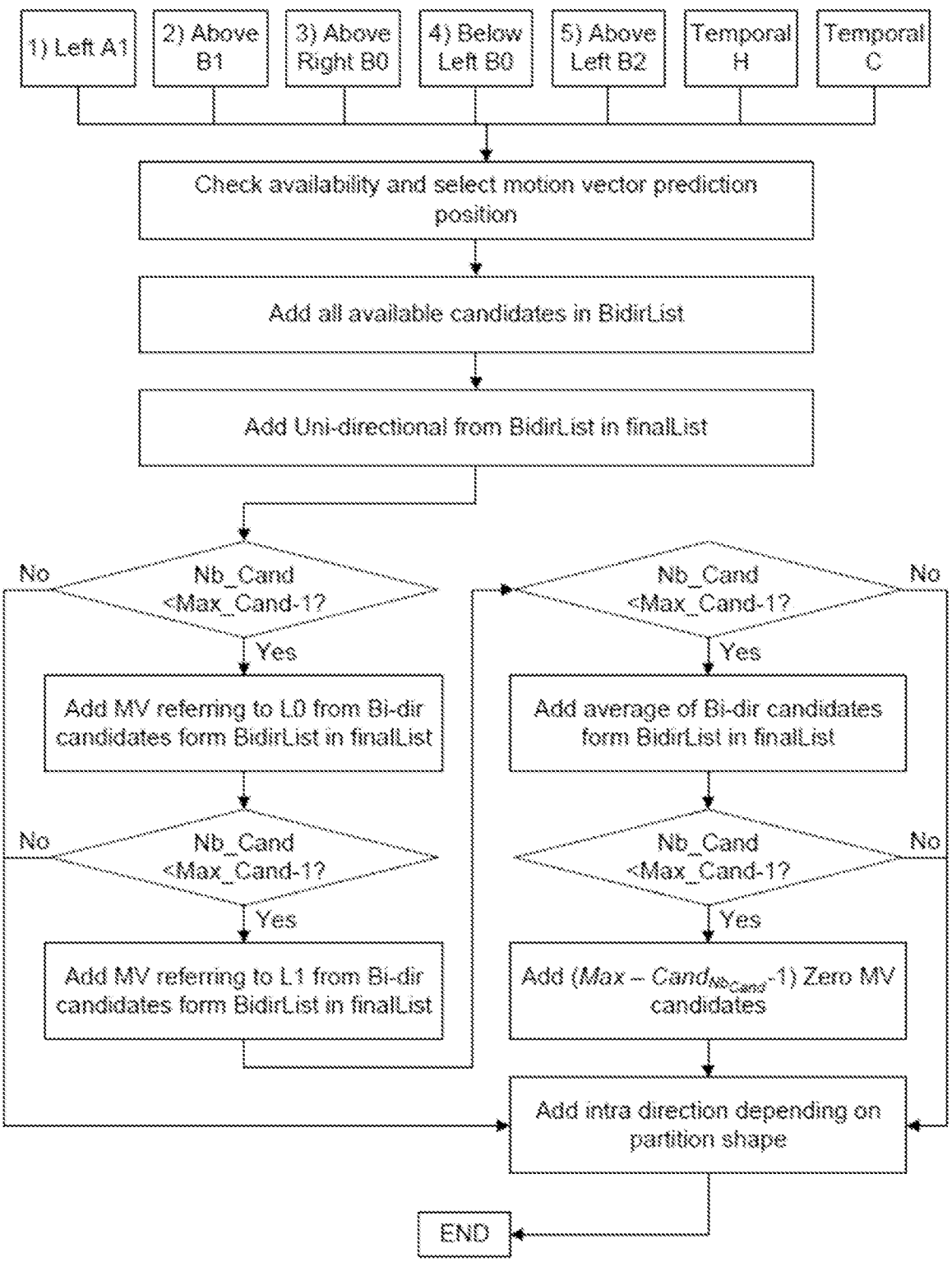
FIG. 23 illustrates a derivation process for predictors for multiple shapes partitions where an intra direction is added at the end of a list.

The derivation process of predictors for triangle/multiple shapes partitions is modified as shown in FIG. 23.

In a first variant, some intra directional prediction may be added for a first prediction (PU) but not for a second prediction (PU) as reference samples used for prediction may be far from the second prediction.

In another variant, the intra DC, Planar modes, or other intra directions may be added depending on the prediction shape.

In another variant, intra prediction may be chosen for PU0 and PU1, in this case multi-hypothesis is intra-intra, and the weighting process depends on the selected intra directions.

Separate Predictor Candidates for List 0 and List 1 for Multiple Shapes

Figure 24:
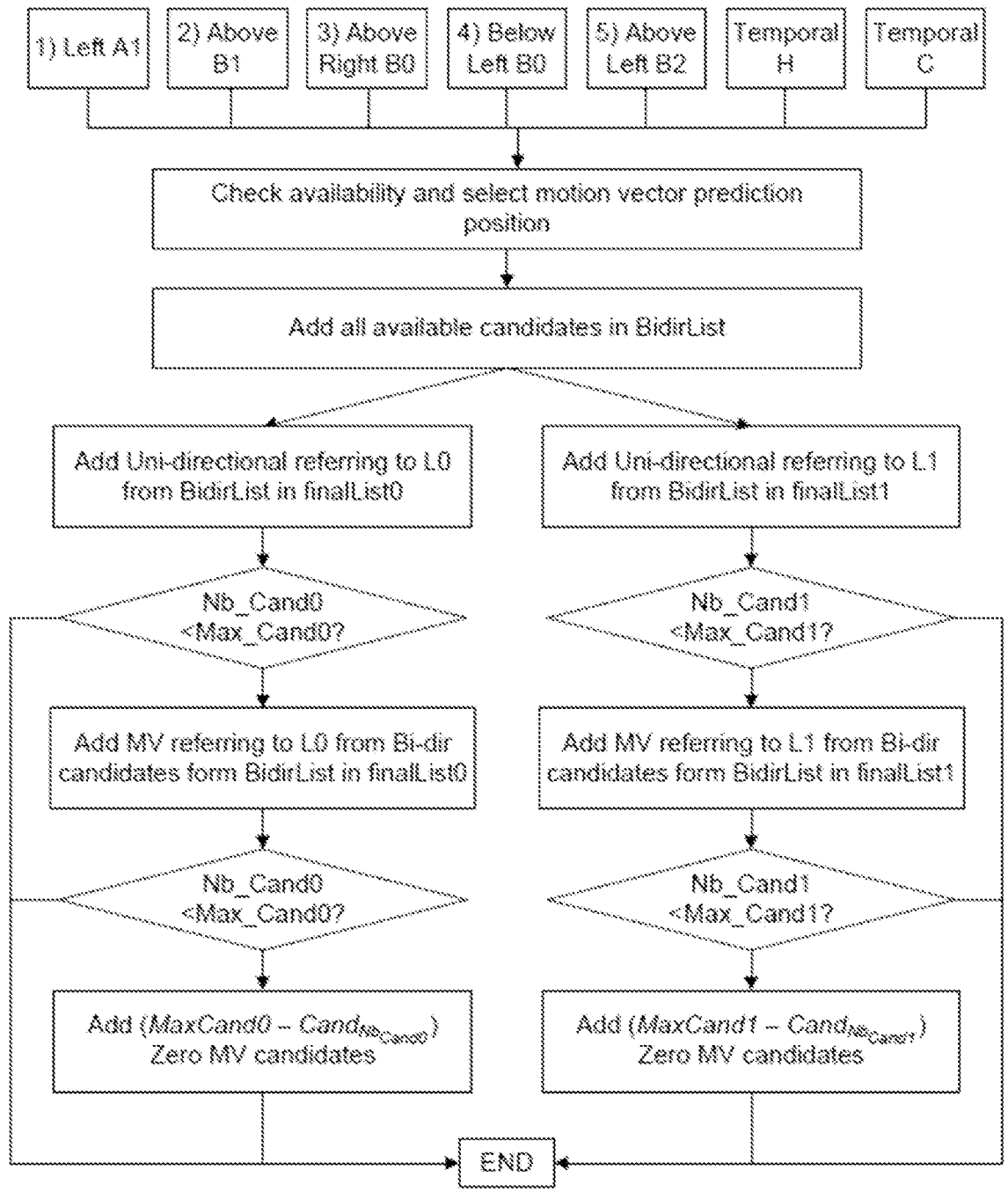
FIG. 24 illustrates a separated predictor derivation process for each list 0 and list 1.

In an embodiment, two lists of predictors are derived for a CU using multiple shapes Prediction Units, as shown in FIG. 24. The first list of predictors contains only Motion Vectors referring to LIST_0 or intra direction, the second list of predictors contains only Motion Vectors referring to LIST_1 or intra direction. If the first Prediction Unit uses a candidate from List 0, the second Prediction Unit uses a predictor from List 1, if the first Prediction Unit uses a candidate from List 1, the second Prediction Unit uses a predictor from List 0. If 4 candidates are available in each list, the total number of combinations is 2*4*4=32. The first PU may use 4 candidates from List_0 and 4 candidates from List_1, the second PU may use only the 4 candidates from the other list than the first PU.

HMVP (History based Motion Vector Prediction) keeps a buffer of the 6 last Motion Vectors used by the previous coded CUs. This list of predictors may be used in an additional step in the derivations of uni-direction motion vectors for multiple shapes Partitions. In the same way a uni-directional ATMVP candidate derived from the first spatial candidate may be added to the lists of uni-directional predictors.

Merge with Motion Vector Difference (MMVD) adds a small Motion Vector Difference (MVD) to the first or second merge candidate. The usage of MMVD for multiple shapes partitions may increase the coding efficiency. The only constraint for MMVD, is it only applies to inter predictors.

The issue with embodiments where an intra predictor is in the merge list, is that during the parsing stage, it is not known if the merge index parsed indicates the use of an intra predictor. One solution is to add intra predictor after the number of inter candidates available for MMVD (for example 2 inter candidates).

Separate Predictor Candidates for Each Prediction Unit

Figure 25:
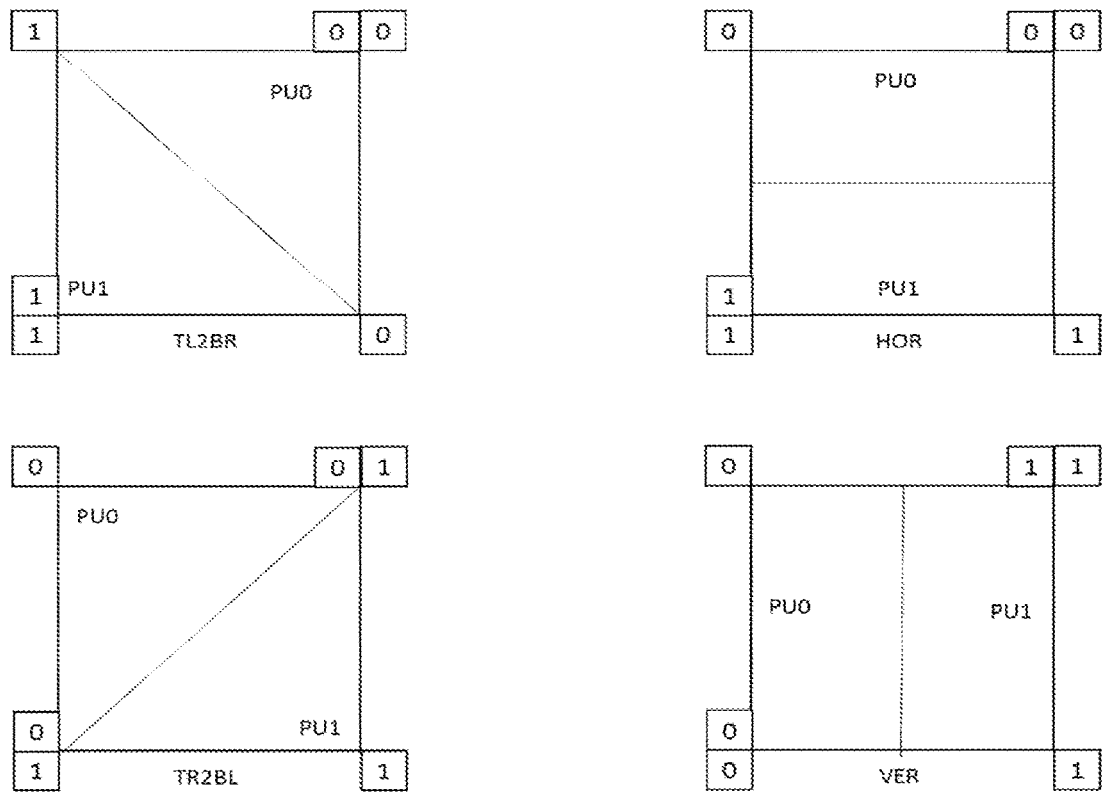
FIG. 25 illustrates spatial and temporal positions checked for each PUs.

In an embodiment, two lists of predictors are derived for CU using multiple shapes Prediction Units, one list per Prediction Units. Spatial positions checked are not the same for each partition. The candidate list derivation is also different for all the shapes, as shown in FIG. 25. The spatial positions Above-Left, Above, Above-Right, Left, Bottom-Left and the temporal position are either used for PU0 or PU1. For example, in FIG. 25, for the TL2BR shape (Top-left figure), Above, Above-Right and temporal positions are checked to derive the list of motion vector predictors for PU0 and Above-Left, Left and Bottom-Left positions are checked to derive the list of motion vector predictors for PU1.

Figure 26:
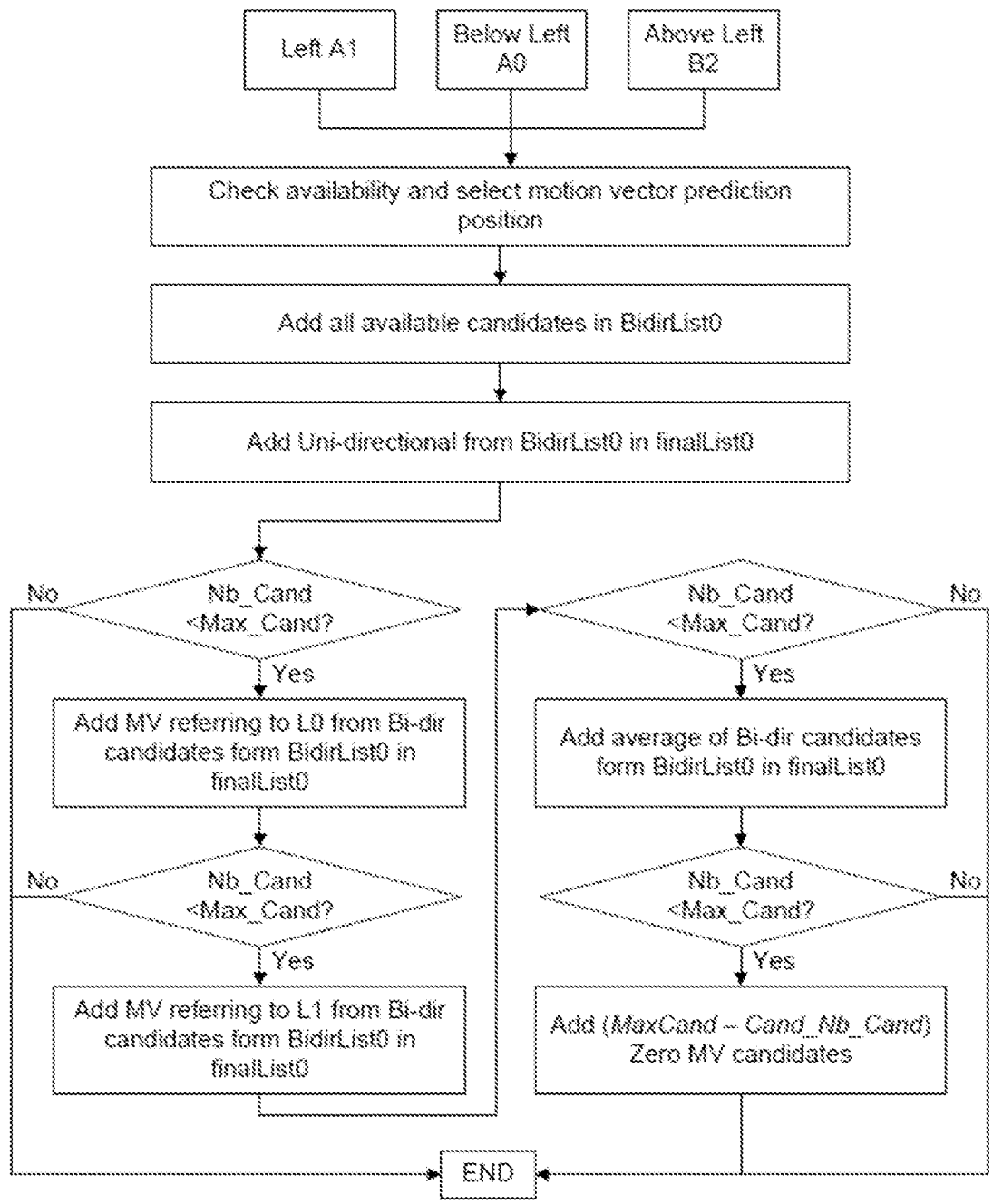
FIG. 26 illustrates example of separate candidate derivation for the 2 PUs of a TL2BR triangle partition (part 1/2).
Figure 27:
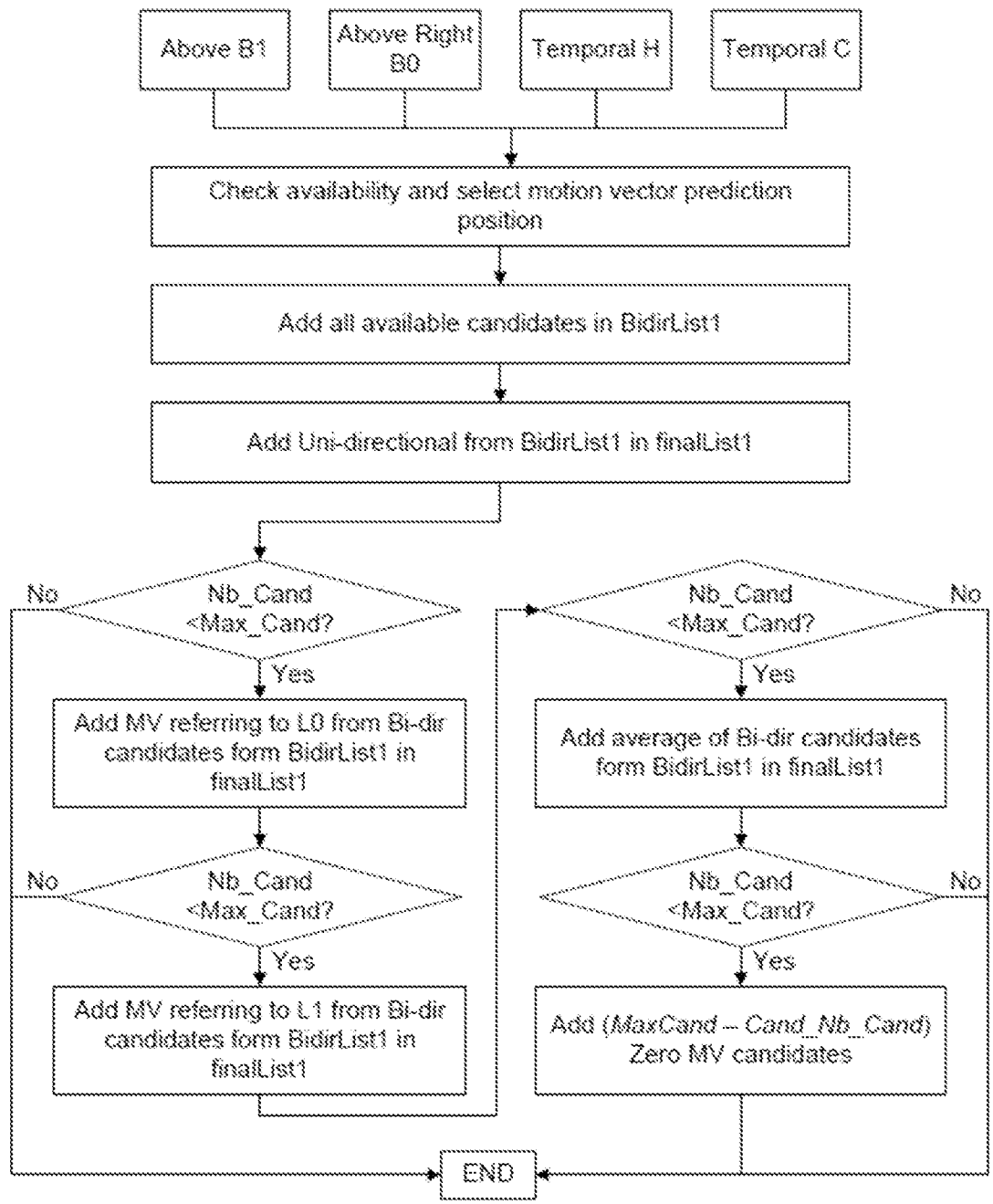
FIG. 27 illustrates example of separate candidate derivation for the 2 PUs of a TL2BR triangle partition (part 2/2).

The separated candidate derivation for each partition of a TL2BR triangle partition is shown in FIGS. 26 and 27. Spatial and temporal positions checked are different for both partitions, but the process is the same for both partitions.

In this embodiment, a Planar or Affine uni-directional candidates may be added in predictor derivation process by using two or more spatial positions (same as checked for motion vectors). When Affine uses inherited motion models, the same process applies to select the candidates. When Affine uses constructed motion models, the same process applies to each Control Point Motion Vectors (CPMV) candidates used to construct the motion model. For Planar or Regression Motion Vector Field (RIVF), the same process applies, only sub-blocks close to the partitions may be used to derive the motion model. In case there is no adjacent sub-block to the partition, the mode is unavailable. For example, Planar is unavailable for PU1 in TR2BL partition.

In a variant, a spatial position is near the boundary between the 2 partitions, this position may be used for both lists, for example the Top-Left positions for TL2BR partition. In case of AMVP, only one mvd is transmitted for a shared spatial position between two PUs. In a variant, the spatial positions checked is different for the two PUs but is the same for all shapes. In another variant, other position than spatial positions is checked in HEVC merge, and depends on the partition, as shown in the example of horizontal partition in FIG. 28.

Figures 28, 29:
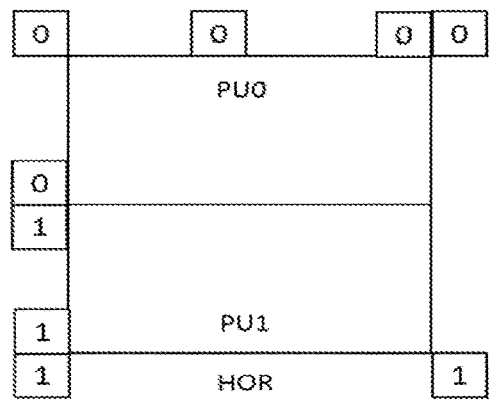
FIG. 28 illustrates new positions checked for the candidate list derivation.
FIG. 29 illustrates prediction information storage for multiple shapes and multi-hypothesis combination.

Intra and Inter Information Propagation for Multi-Hypothesis and Multiple Shapes Combination When a CU is coded with multi-hypothesis, both inter motion information and intra direction are stored, and can be used for neighboring blocks prediction. An intra coded block may use the intra direction used in a neighboring block having been coded with multi-hypothesis mode (and inversely). In a CU using multi-hypothesis, motion vector and intra direction used for prediction are stored for all the sub-block inside this CU, whatever the intra direction is, as depicted in FIG. 29.

In at least one embodiment, inter and intra information are stored for each sub-block depending on how this sub-block was predicted, according to weight storage by sub-block. Typically, for some sub-blocks, intra (inter respectively)

information is not stored as it has not been used during the prediction process of this sub-block, as depicted in FIG. 30. This embodiment advantageously reduces the storage memory needs.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, the processes presented in FIGS. 4 and 8.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, the process of FIGS. 4 and 8.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular mode. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types:

A syntax for handling a prediction of a block while encoding or decoding a video, said prediction being performed either using two different inter predictions or a combination of an inter and an intra prediction, wherein the syntax comprises elements related to the prediction of a block. Said syntax is comprises a weighting between the two predictions is done at a sub-block level. Said syntax is comprises a storage of motion vectors with corresponding weighting value are done at a sub-block level.

A video encoding method comprising a block prediction being performed either using two different inter predictions or a combination of an inter prediction and an intra prediction, and wherein the weighting between the two predictions is done at a sub-block level. A video encoding method comprising a block prediction being performed either using two different inter predictions or a combination of an inter prediction and an intra prediction, and wherein the weighting between the two predictions and the storage of motion vectors with corresponding weighting value are done at a sub-block level.

A video decoding method comprising a block prediction being performed either using two different inter predictions or a combination of an inter prediction and an intra prediction, and wherein the weighting between the two predictions is done at a sub-block level. A video encoding method comprising a block prediction being performed either using two different inter predictions or a combination of an inter prediction and an intra prediction, and wherein the weighting between the two predictions and the storage of motion vectors with corresponding weighting value are done at a sub-block level.

A video encoder, transcoder or other electronic device performs video encoding comprising a block prediction being performed either using two different inter predictions or a combination of an inter prediction and an intra prediction, and wherein the weighting between the two predictions is done at a sub-block level. A video encoding method comprising a block prediction being performed either using two different inter predictions or a combination of an inter and an intra prediction, and wherein the weighting between the two predictions and the storage of motion vectors with corresponding weighting value are done at a sub-block level.

A TV, set-top box, cell phone, tablet, or other electronic device performs video decoding comprising a block prediction being performed either using two different inter predictions or a combination of an inter and an intra prediction, and wherein the weighting between the two predictions is done at a sub-block level. A video encoding method comprising a block prediction being performed either using two different inter predictions or a combination of an inter and an intra prediction, and wherein the weighting between the two predictions and the storage of motion vectors with corresponding weighting value are done at a sub-block level.

The invention claimed is:

1. A method comprising:
   determining that multiple shape prediction mode and multi-hypothesis prediction mode are both enabled for an image block;
   partitioning the image block into at least a first prediction block and a second prediction block;
   deriving a first multiple shape prediction candidate list of at least one motion vector predictor for the first prediction block and a second multiple shape prediction candidate list of at least one motion vector predictor for the second prediction block, the second multiple shape prediction candidate list being different from the first multiple shape prediction candidate list; and
   decoding the first and second prediction blocks, wherein decoding the first prediction block comprises obtaining prediction information for the first prediction block based on the first multiple shape prediction candidate list and decoding the second prediction block comprises obtaining prediction information for the second prediction block based on the second multiple shape prediction candidate list;
   wherein deriving the first multiple shape prediction candidate list comprises adding at least one intra mode of a first neighboring block to the first multiple shape prediction candidate list or comprises adding at least one intra mode selected in a set of intra modes based on a shape of the first prediction block to the first multiple shape prediction candidate list; and
   wherein deriving the second multiple shape prediction candidate list comprises adding at least one intra mode of a second neighboring block to the second multiple shape prediction candidate list on comprises adding at least one intra mode selected in a set of intra modes based on a shape of the second prediction block to the second multiple shape prediction candidate list.

2. The method of claim 1, wherein deriving the first multiple shape prediction candidate list comprises adding at least one motion vector of one or more first spatial candidates into the first multiple shape prediction candidate list and wherein deriving the second multiple shape prediction candidate list comprises adding at least one motion vector of one or more second spatial candidates into the second multiple shape prediction candidate list, at least one first spatial candidate being different from each of the one or more second spatial candidates.

3. The method of claim 1, wherein deriving the first multiple shape prediction candidate list comprises adding at least one motion vector of one or more first spatial candidates into the first multiple shape prediction candidate list and wherein deriving the second multiple shape prediction candidate list comprises adding at least one motion vector of one or more second spatial candidates into the second multiple shape prediction candidate list and wherein one or more first spatial candidates are determined based on a shape of the first prediction block and wherein the one or more second spatial candidates are determined based on a shape of the second prediction block.

4. The method of claim 1, wherein deriving the first multiple shape prediction candidate list comprises adding at least one motion vector of one or more first temporal candidates into the first multiple shape prediction candidate list and wherein deriving the second multiple shape prediction candidate list comprises adding at least one motion vector of one or more second temporal candidates into the second multiple shape prediction candidate list, at least one first temporal candidate being different from each of the one or more second temporal candidates.

5. The method of claim 1, wherein deriving the first multiple shape prediction candidate list comprises adding at least one motion vector of one or more first temporal candidates into the first multiple shape prediction candidate list and wherein deriving the second multiple shape prediction candidate list comprises adding at least one motion vector of one or more second temporal candidates into the second multiple shape prediction candidate list, wherein the one or more first temporal candidates are determined based on a shape of the first prediction block and wherein the one or more second temporal candidates are determined based on a shape of the second prediction block.

6. An apparatus comprising one or more processors and at least one memory coupled to the one or more processors, wherein the one or more processors are configured to perform:
  determining that multiple shape prediction mode and multi-hypothesis prediction mode are both enabled for an image block;
  partitioning the image block into at least a first prediction block and a second prediction block;
  deriving a first multiple shape prediction candidate list of at least one motion vector predictor for the first prediction block and a second multiple shape prediction candidate list of at least one motion vector predictor for the second prediction block, the second multiple shape prediction candidate list being different from the first multiple shape prediction candidate list; and
  decoding the first and second prediction blocks, wherein decoding the first prediction block comprises obtaining prediction information for the first prediction block based on the first multiple shape prediction candidate list and decoding the second prediction block comprises obtaining prediction information for the second prediction block based on the second multiple shape prediction candidate list;
  wherein deriving the first multiple shape prediction candidate list comprises adding at least one intra mode of a first neighboring block to the first multiple shape prediction candidate list or comprises adding at least one intra mode selected in a set of intra modes based on a shape of the first prediction block to the first multiple shape prediction candidate list; and
  wherein deriving the second multiple shape prediction candidate list comprises adding at least one intra mode of a second neighboring block to the second multiple shape prediction candidate list or comprises adding at least one intra mode selected in a set of intra modes based on a shape of the second prediction block to the second multiple shape prediction candidate list.

7. The apparatus of claim 6, wherein deriving the first multiple shape prediction candidate list comprises adding at least one motion vector of one or more first spatial candidates into the first multiple shape prediction candidate list and wherein deriving the second multiple shape prediction candidate list comprises adding at least one motion vector of one or more second spatial candidates into the second multiple shape prediction candidate list, at least one first spatial candidate being different from each of the one or more second spatial candidates.

8. The apparatus of claim 6, wherein deriving the first multiple shape prediction candidate list comprises adding at least one motion vector of one or more first spatial candidates into the first multiple shape prediction candidate list and wherein deriving the second multiple shape prediction candidate list comprises adding at least one motion vector of one or more second spatial candidates into the second multiple shape prediction candidate list and wherein one or more first spatial candidates are determined based on a shape of the first prediction block and wherein the one or more second spatial candidates are determined based on a shape of the second prediction block.

9. The apparatus of claim 6, wherein deriving the first multiple shape prediction candidate list comprises adding at least one motion vector of one or more first temporal candidates into the first multiple shape prediction candidate list and wherein deriving the second multiple shape prediction candidate list comprises adding at least one motion vector of one or more second temporal candidates into the second multiple shape prediction candidate list, at least one first temporal candidate being different from each of the one or more second temporal candidates.

10. The apparatus of claim 6, wherein deriving the first multiple shape prediction candidate list comprises adding at least one motion vector of one or more first temporal candidates into the first multiple shape prediction candidate list and wherein deriving the second multiple shape prediction candidate list comprises adding at least one motion vector of one or more second temporal candidates into the second multiple shape prediction candidate list, wherein the one or more first temporal candidates are determined based on a shape of the first prediction block and wherein the one or more second temporal candidates are determined based on a shape of the second prediction block.

11. A method comprising:
  determining that multiple shape prediction mode and multi-hypothesis prediction mode are both enabled for an image block;
  partitioning the image block into at least a first prediction block and a second prediction block;
  deriving a first multiple shape prediction candidate list of at least one motion vector predictor for the first prediction block and a second multiple shape prediction candidate list of at least one motion vector predictor for the second prediction block, the second multiple shape prediction candidate list being different from the first multiple shape prediction candidate list; and
  encoding the first and second prediction blocks, wherein encoding the first prediction block comprises obtaining prediction information for the first prediction block based on the first multiple shape prediction candidate list and encoding the second prediction block comprises obtaining prediction information for the second prediction block based on the second multiple shape prediction candidate list;

wherein deriving the first multiple shape prediction candidate list comprises adding at least one intra mode of a first neighboring block to the first multiple shape prediction candidate list or comprises adding at least one intra mode selected in a set of intra modes based on a shape of the first prediction block to the first multiple shape prediction candidate list; and wherein deriving the second multiple shape prediction candidate list comprises adding at least one intra mode of a second neighboring block to the second multiple shape prediction candidate list or comprises adding at least one intra mode selected in a set of intra modes based on a shape of the second prediction block to the second multiple shape prediction candidate list.

12. The method of claim 11, wherein deriving the first multiple shape prediction candidate list comprises adding at least one motion vector of one or more first spatial candidates into the first multiple shape prediction candidate list and wherein deriving the second multiple shape prediction candidate list comprises adding at least one motion vector of one or more second spatial candidates into the second multiple shape prediction candidate list, at least one first spatial candidate being different from each of the one or more second spatial candidates.

13. The method of claim 11, wherein deriving the first multiple shape prediction candidate list comprises adding at least one motion vector of one or more first spatial candidates into the first multiple shape prediction candidate list and wherein deriving the second multiple shape prediction candidate list comprises adding at least one motion vector of one or more second spatial candidates into the second multiple shape prediction candidate list and wherein one or more first spatial candidates are determined based on a shape of the first prediction block and wherein the one or more second spatial candidates are determined based on a shape of the second prediction block.

14. The method of claim 11, wherein deriving the first multiple shape prediction candidate list comprises adding at least one motion vector of one or more first temporal candidates into the first multiple shape prediction candidate list and wherein deriving the second multiple shape prediction candidate list comprises adding at least one motion vector of one or more second temporal candidates into the second multiple shape prediction candidate list, at least one first temporal candidate being different from each of the one or more second temporal candidates.

15. The method of claim 11, wherein deriving the first multiple shape prediction candidate list comprises adding at least one motion vector of one or more first temporal candidates into the first multiple shape prediction candidate list and wherein deriving the second multiple shape prediction candidate list comprises adding at least one motion vector of one or more second temporal candidates into the second multiple shape prediction candidate list, wherein the one or more first temporal candidates are determined based on a shape of the first prediction block and wherein the one or more second temporal candidates are determined based on a shape of the second prediction block.

16. An apparatus comprising one or more processors and at least one memory coupled to the one or more processors, wherein the one or more processors are configured to perform:

determining that multiple shape prediction mode and multi-hypothesis prediction mode are both enabled for an image block;

partitioning the image block into at least a first prediction block and a second prediction block;

deriving a first multiple shape prediction candidate list of at least one motion vector predictor for the first prediction block and a second multiple shape prediction candidate list of at least one motion vector predictor for the second prediction block, the second multiple shape prediction candidate list being different from the first multiple shape prediction candidate list; and encoding the first and second prediction blocks, wherein encoding the first prediction block comprises obtaining prediction information for the first prediction block based on the first multiple shape prediction candidate list and encoding the second prediction block comprises obtaining prediction information for the second prediction block based on the second multiple shape prediction candidate list;

wherein deriving the first multiple shape prediction candidate list comprises adding at least one intra mode of a first neighboring block to the first multiple shape prediction candidate list or comprises adding at least one intra mode selected in a set of intra modes based on a shape of the first prediction block to the first multiple shape prediction candidate list; and wherein deriving the second multiple shape prediction candidate list comprises adding at least one intra mode of a second neighboring block to the second multiple shape prediction candidate list or comprises adding at least one intra mode selected in a set of intra modes based on a shape of the second prediction block to the second multiple shape prediction candidate list.

17. The apparatus of claim 16, wherein deriving the first multiple shape prediction candidate list comprises adding at least one motion vector of one or more first spatial candidates into the first multiple shape prediction candidate list and wherein deriving the second multiple shape prediction candidate list comprises adding at least one motion vector of one or more second spatial candidates into the second multiple shape prediction candidate list, at least one first spatial candidate being different from each of the one or more second spatial candidates.

18. The apparatus of claim 16, wherein deriving the first multiple shape prediction candidate list comprises adding at least one motion vector of one or more first spatial candidates into the first multiple shape prediction candidate list and wherein deriving the second multiple shape prediction candidate list comprises adding at least one motion vector of one or more second spatial candidates into the second multiple shape prediction candidate list and wherein one or more first spatial candidates are determined based on a shape of the first prediction block and wherein the one or more second spatial candidates are determined based on a shape of the second prediction block.

19. The apparatus of claim 16, wherein deriving the first multiple shape prediction candidate list comprises adding at least one motion vector of one or more first temporal candidates into the first multiple shape prediction candidate list and wherein deriving the second multiple shape prediction candidate list comprises adding at least one motion vector of one or more second temporal candidates into the second multiple shape prediction candidate list, at least one first temporal candidate being different from each of the one or more second temporal candidates.

20. The apparatus of claim 16, wherein deriving the first multiple shape prediction candidate list comprises adding at least one motion vector of one or more first temporal candidates into the first multiple shape prediction candidate list and wherein deriving the second multiple shape prediction candidate list comprises adding at least one motion vector of one or more second temporal candidates into the second multiple shape prediction candidate list, wherein the one or more first temporal candidates are determined based on a shape of the first prediction block and wherein the one or more second temporal candidates are determined based on a shape of the second prediction block.

\* \* \* \* \*